US012335729B2

(12) United States Patent
Ben Henda et al.

(10) Patent No.: US 12,335,729 B2
(45) Date of Patent: *Jun. 17, 2025

(54) METHODS PROVIDING SECURITY FOR MULTIPLE NAS CONNECTIONS USING SEPARATE COUNTS AND RELATED NETWORK NODES AND WIRELESS TERMINALS

(71) Applicant: Telefonaktiebolaget LM Ericsson (publ), Stockholm (SE)

(72) Inventors: Noamen Ben Henda, Stockholm (SE); Monica Wifvesson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,485

(22) Filed: Apr. 4, 2023

(65) Prior Publication Data

US 2023/0284017 A1 Sep. 7, 2023

Related U.S. Application Data

(63) Continuation of application No. 16/983,378, filed on Aug. 3, 2020, now Pat. No. 11,653,205, which is a (Continued)

(51) Int. Cl.
*H04L 9/32* (2006.01)
*H04L 67/1097* (2022.01)
(Continued)

(52) U.S. Cl.
CPC ......... *H04W 12/069* (2021.01); *H04L 9/3242* (2013.01); *H04L 67/1097* (2013.01);
(Continued)

(58) Field of Classification Search
CPC ........... H04W 12/1006; H04W 12/001; H04W 12/0609; H04W 12/02; H04W 76/15;
(Continued)

(56) References Cited

U.S. PATENT DOCUMENTS 9,521,528 B1 12/2016 Gupta et al.
2012/0020249 A1 1/2012 Sundararaman et al.
(Continued)

FOREIGN PATENT DOCUMENTS

AU 2013200612 A1 2/2013
CN 103843428 A 6/2024
(Continued)

OTHER PUBLICATIONS

International Search Report and Written Opinion of the International Searching Authority, PCT/EP2018/061713, mailed Jun. 12, 2018, 8 pages.
(Continued)

*Primary Examiner* — Khoi V Le
(74) *Attorney, Agent, or Firm* — Sage Patent Group

(57) ABSTRACT

A first communication node may provide first and second NAS connection identifications for respective first and second NAS connections between the first and a second communication node, with the first and second NAS connection identifications being different and the first and second NAS connections being different. A first NAS message may be communicated between the first and second communication nodes over the first NAS connection, including at performing integrity protection for the first NAS message using the first NAS connection identification and/or performing confidentiality protection for the first NAS message using the first NAS connection identification. A second NAS message may be communicated between the first and second communication nodes over the second NAS connection, includ-
(Continued)

ing performing integrity protection for the second NAS message using the second NAS connection identification and/or performing confidentiality protection for the second NAS message for confidentiality protection using the second NAS connection identification.

13 Claims, 11 Drawing Sheets

Related U.S. Application Data continuation of application No. 16/473,311, filed as application No. PCT/EP2018/061713 on May 7, 2018, now Pat. No. 10,771,978.

(60) Provisional application No. 62/502,966, filed on May 8, 2017.

(51) Int. Cl.
| | |
|---|---|
| *H04W 12/02* | (2009.01) |
| *H04W 12/03* | (2021.01) |
| *H04W 12/033* | (2021.01) |
| *H04W 12/041* | (2021.01) |
| *H04W 12/0431* | (2021.01) |
| *H04W 12/069* | (2021.01) |
| *H04W 12/106* | (2021.01) |
| *H04W 72/52* | (2023.01) |
| *H04W 76/15* | (2018.01) |
| *H04W 84/18* | (2009.01) |

(52) U.S. Cl.
CPC ........... *H04W 12/02* (2013.01); *H04W 12/03* (2021.01); *H04W 12/033* (2021.01); *H04W 12/041* (2021.01); *H04W 12/0431* (2021.01); *H04W 12/106* (2021.01); *H04W 72/52* (2023.01); *H04W 76/15* (2018.02); *H04L 2209/80* (2013.01); *H04W 84/18* (2013.01)

(58) Field of Classification Search
CPC .............. H04W 72/1252; H04W 84/18; H04L 67/1097; H04L 9/3242; H04L 2209/80
See application file for complete search history.

(56) References Cited

U.S. PATENT DOCUMENTS

| | | | |
|---|---|---|---|
| 2012/0202491 A1* | 8/2012 | Fox | H04W 12/102 |
| | | | 455/450 |
| 2015/0172959 A1 | 6/2015 | Cucala Garcia et al. | |
| 2016/0286600 A1* | 9/2016 | Faccin | H04W 76/27 |

FOREIGN PATENT DOCUMENTS

| | | |
|---|---|---|
| KR | 1020110052440 A | 5/2011 |
| KR | 1020140054299 A | 5/2014 |
| WO | 2010004295 A2 | 1/2010 |
| WO | 2017049461 A1 | 3/2017 |

OTHER PUBLICATIONS

International Preliminary Report on Patentability, PCT/EP2018/061713, dated Apr. 18, 2019, 17 Pages.

3GPP TS 23.501 V0.4.0 (Apr. 2017), "3rd Generation Partnership Project; Technical Specification Group Services and System Aspects; System Architecture for the 5G System; Stage 2 (Release 15)" 124 Pages.

3GPP TS 24.301 V14.3.0 (Mar. 2017), 3rd Generation Partnership Project; Technical Specification Group Core Network and Terminals; Non-Access-Stratum (NAS) protocol for Evolved Packet System (EPS); Stage 3 (Release 14), 476 Pages.

3GPP TS 33.220 V14.0.0 (Dec. 2016), 3rd Generation Partnership Project; Technical Specification Group Services and System Aspects; Generic Authentication Architecture (GAA); Generic Bootstrapping Architecture (GBA) (Release 14), 93 Pages.

3GPP TS 33.401 V14.2.0 (Mar. 2017), 3rd Generation Partnership Project; Technical Specification Group Services and System Aspects; 3GPP System Architecture Evolution (SAE); Security architecture (Release 14), 152 Pages.

Krawczyk, et al., "HMAC: Keyed-Hashing for Message Authentication," RFC 2104, Feb. 1997, Accessed from: https://tools.ietf.org/html/rfc2104 on Apr. 11, 2018, 12 Pages.

Qualcomm Incorporated, S2-171705, "TS 23.501: support of differentiated NAS protection over multiple N1 instances", SA WG2 Meeting #S2-120, S2-171705, Mar. 27-31, 2017, Busan, South Korea, 4 pages.

Search Report and Office Action for Chinese Patent Application No. 2018800307641, mailed Jan. 18, 2022, 5 pages.

Chinese Office Action and English Translation, Chinese Application No. 202210948654.1, mailed Mar. 26, 2025, 9 pages.

* cited by examiner

MESSAGE ORGANIZATION FOR A SECURITY PROTECTED NAS MESSAGE

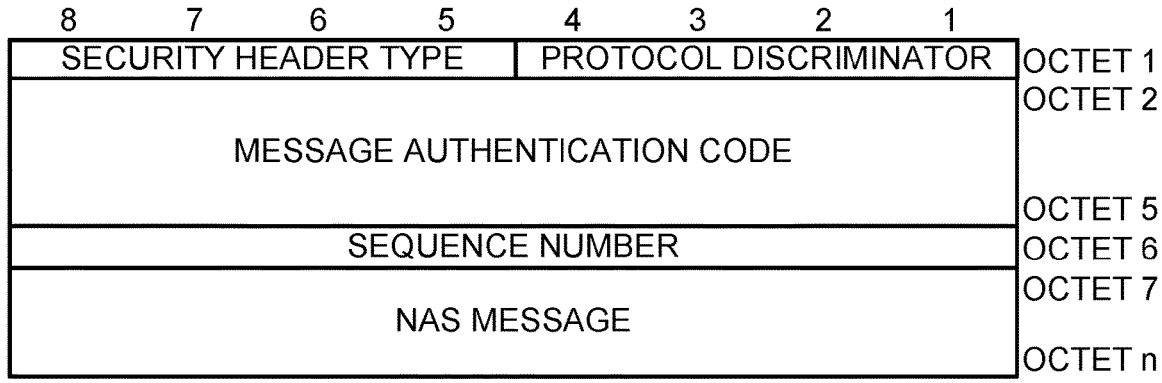

Figure 1

SECURITY HEADER TYPES

```
SECURITY HEADER TYPE (OCTET 1)

8 7 6 5
0 0 0 0   PLAIN NAS MESSAGE, NOT SECURITY PROTECTED

SECURITY PROTECTED NAS MESSAGE
0 0 0 1   INTEGRITYPROTECTED
0 0 1 0   INTEGRITYPROTECTED AND CIPHERED
0 0 1 1   INTEGRITYPROTECTED WITH NEW EPS SECURITY CONTEXT
          (NOTE 1)
0 1 0 0   INTEGRITYPROTECTED AND CIPHERED WITH NEW EPS
          SECURITY CONTEXT (NOTE 2)
0 1 0 1   INTEGRITYPROTECTED AND PARTIALLY CIPHERED NAS
          MESSAGE (NOTE 2)

NON-STANDARD L3 MESSAGE:
1 1 0 0   SECURITY HEADER FOR THE SERVICE REQUEST MESSAGE 1 1 0 1   THESE VALUES ARE NOT USED IN THIS VERSION OF THE
    TO    PROTOCOL
1 1 1 1   IF RECEIVED THEY SHALL BE INTERPRETED AS '1100'.
          (NOTE 3)

ALL OTHER VALUES ARE RESERVED
```

Figure 2

SECURITY DERIVATION OF
MAC-I/NAS-MAC (SENDER)

SECURITY DERIVATION OF
XMAC-I/XNAS-MAC (RECEIVER)

CIPHERING OF DATA (SENDER)

CIPHERING OF DATA (RECEIVER)

NAS SECURITY FUNCTION (NETWORK NODE)

NAS SECURITY FUNCTION (WIRELESS TERMINAL)

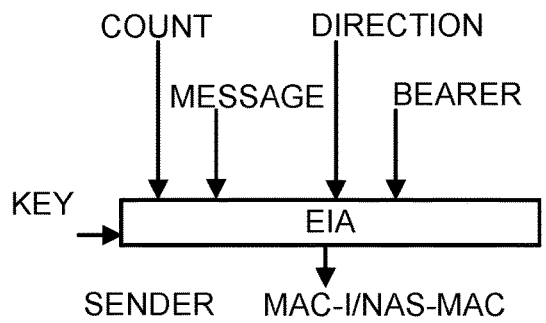 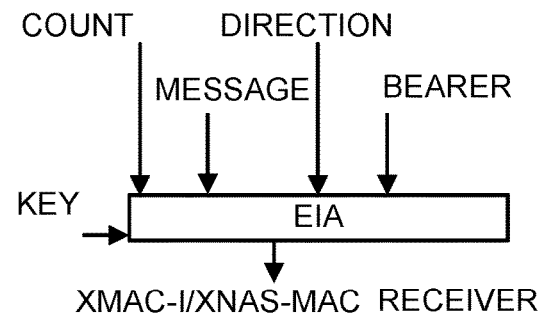
Figure 10A    Figure 10B
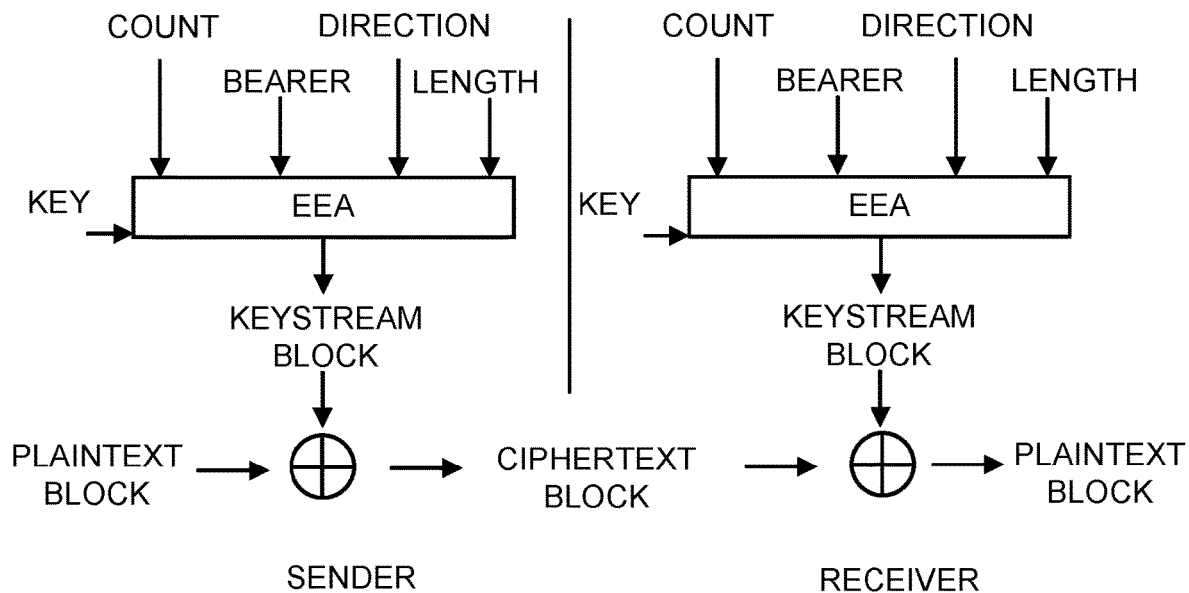
Figure 11A    Figure 11B

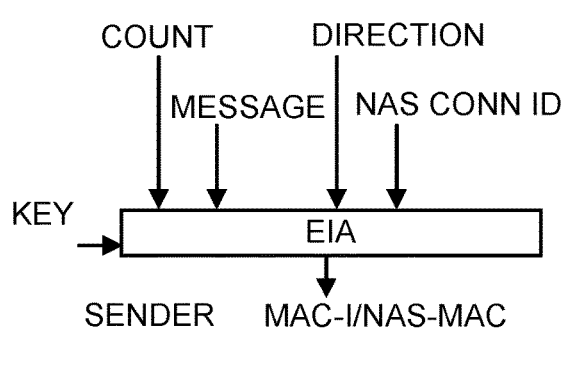 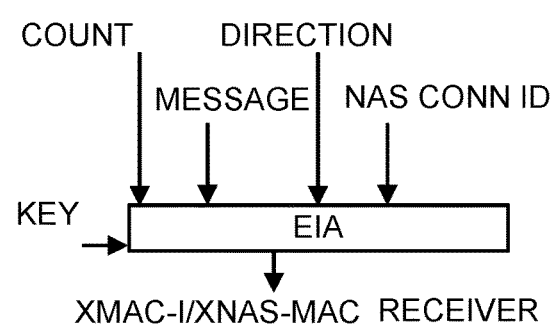
Figure 12A  Figure 12B
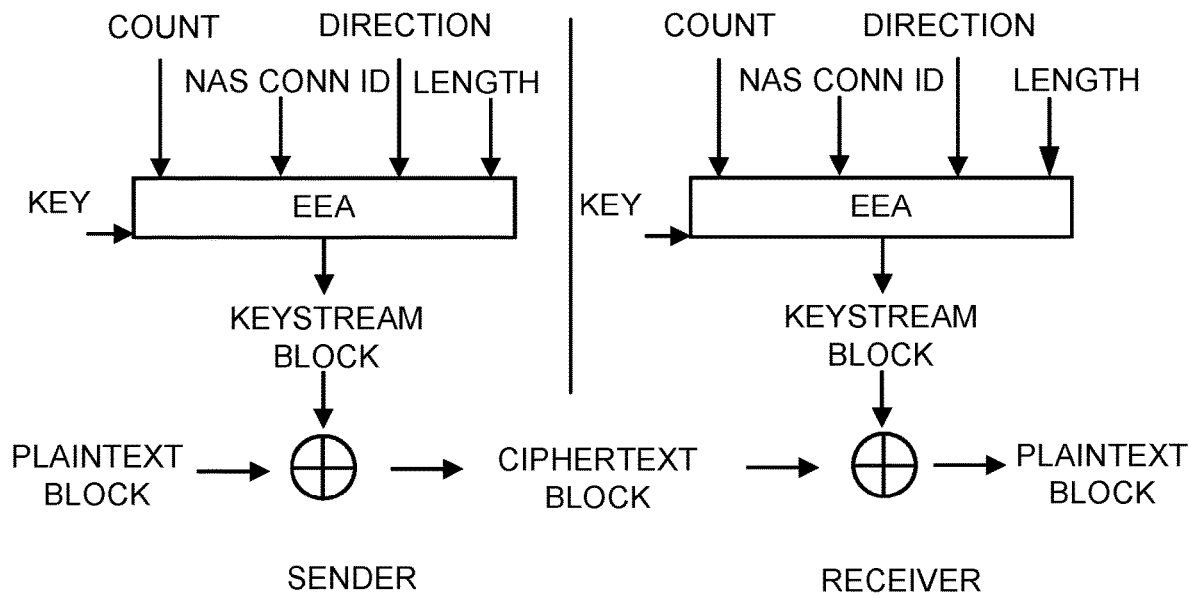
Figure 13A  Figure 13B

| PROCESS DISTINGUISHER | VALUE |
|---|---|
| NAS-enc-alg | 0x01 |
| NAS-int-alg | 0x02 |

METHODS PROVIDING SECURITY FOR MULTIPLE NAS CONNECTIONS USING SEPARATE COUNTS AND RELATED NETWORK NODES AND WIRELESS TERMINALS

CROSS REFERENCE TO RELATED APPLICATIONS

This application is a continuation of U.S. patent application Ser. No. 16/983,378 filed on Aug. 3, 2020 which is a continuation of U.S. patent application Ser. No. 16/473,311 filed on Jun. 25, 2019, which is a 35 U.S.C. § 371 national stage application of PCT International Application No. PCT/EP2018/061713 filed on May 7, 2018, which in turns claims domestic priority to U.S. Provisional Patent Application No. 62/502,966, filed on May 8, 2017 the disclosures and content of which are incorporated by reference herein in their entireties.

TECHNICAL FIELD

The present disclosure relates generally to the field of communications, and more particularly to wireless communications and related network nodes and wireless terminals.

BACKGROUND

In 5G Systems, a UE may be registered simultaneously to the same PLMN over 3GPP access (for example, using an LTE or 5G access node, also referred to as a base station, eNB, gNB, etc.) and non-3GPP access (for example, using a WiFi or satellite node). For this purpose, it is expected that the wireless terminal UE and the network AMF (Access Management Function) maintain one connection for each access type (i.e., one connection for the 3GPP access and one connection for the non-3GPP NAS connection). In such scenarios, TS 23.501 (referred to as reference [1]) further describes which elements of the user context in the AMF would be shared among the connections and which would not. For example, there may be multiple Connection Management (CM) and Registration Management states, one per access type. On the other hand, a common temporary identifier may be used.

As described in TS 33.401 [2], the security mechanisms in legacy systems may provide integrity, confidentiality, and replay protection for NAS messages. The NAS security context includes the KASME key, the derived protection keys KNASint and KNASenc, the key set identifier eKSI and a pair of counters NAS COUNTs, one for each direction (uplink and downlink). These security parameters may be provided for a NAS connection and may be refreshed upon the creation of a new KASME, e.g. following an authentication procedure.

Furthermore, a replay protection mechanism, partly realized by the NAS COUNTs, may rely on assumptions that the protocol is reliable and that NAS procedures are run sequentially such that a new procedure is only started after the termination of the current one. This may provide/guarantee in-order delivery of the NAS messages so that both the UE and the MME need only to store two values for NAS COUNTs, one per direction (i.e., one NAS COUNT for uplink and one NAS COUNT for downlink). These would be the next and the only expected/accepted values.

With multiple connections via 3GPP and non-3GPP accesses, however, in-order delivery of NAS messages via the different connections may be unreliable.

SUMMARY

According to some embodiments of inventive concepts, a method at a first communication node may provide communication of Network Access Stratum (NAS) messages with a second communication node. A first NAS connection identification may be provided for a first NAS connection between the first and second communication nodes, and a second NAS connection identification may be provided for a second NAS connection between the first and second communication nodes. Moreover, the first and second NAS connection identifications may be different, and the first and second NAS connections may be different. A first NAS message may be communicated between the first and second communication nodes over the first NAS connection, and communicating the first NAS message may include performing at least one of generating a message authentication code for integrity authentication of the first NAS message using the first NAS connection identification and/or ciphering/deciphering the first NAS message using the first NAS connection identification. A second NAS message may be communicated between the first and second communication nodes over the second NAS connection, and communicating the second NAS message may include performing at least one of generating a message authentication code for integrity authentication of the second NAS message using the second NAS connection identification and/or ciphering/deciphering the second NAS message using the second NAS connection identification.

According to some other embodiments of inventive concepts, a method at a first communication node may provide communication of Network Access Stratum (NAS) messages with a second communication node. A first NAS connection may be provided between the first and second communication nodes, and a second NAS connection may be provided between the first and second communication nodes. Moreover, the first and second NAS connections may be different. A NAS count domain may be allocated so that a first portion of the NAS count domain is allocated for NAS messages communicated over the first NAS connection and so that a second portion of the NAS count domain is allocated for NAS messages communicated over the second NAS connection. Moreover, the first and second portions of the NAS count domain may be mutually exclusive. NAS messages may be over the first NAS connection using a lowest NAS count value from the first portion of the NAS count domain that has not been previously used for each NAS message communicated over the first NAS connection. NAS messages may be communicated over the second NAS connection using a lowest NAS count value from the second portion of the NAS count domain that has not been previously used for each NAS message communicated over the second NAS connection.

According to some embodiments of inventive concepts disclosed herein, management of parallel NAS connections may be improved.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 1 is a diagram illustrating an example of message organization for a security protected NAS message;

FIG. 2 is a table illustrating security header types of the security protected NAS message of FIG. 1;

FIGS. 10A, 10B, 12A, and 12B illustrate use of an integrity process to authenticate integrity of NAS messages according to some embodiments of inventive concepts;

FIGS. 11A, 11B, 13A, and 13B illustrate use of a ciphering/deciphering process to cipher/decipher data of NAS messages according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 5:
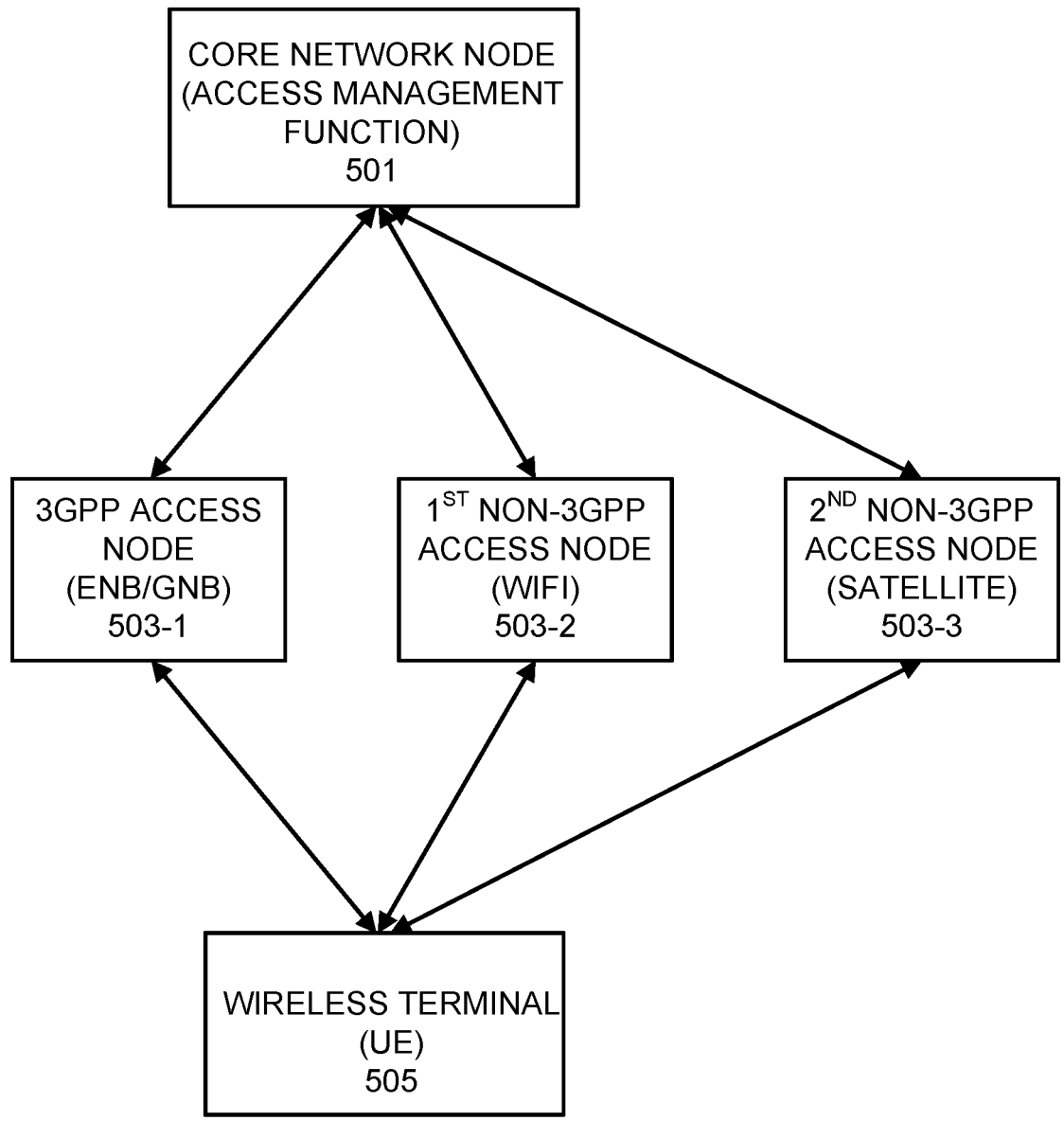
FIG. 5 is a block diagram illustrating multiple NAS connections between a core network node and a wireless terminal according to some embodiments of inventive concepts.

FIG. 5 is a block diagram illustrating multiple NAS connections between core network node 501 (providing access management) and a wireless terminal UE 505 according to some embodiments of inventive concepts. As shown, a first NAS connection may be provided through a 3GPP access node (e.g., a base station, eNB, eNodeB, gNB, gNodeB), a second NAS connection may be provided through a first non-3GPP access node (e.g., a WiFi access node), and a third NAS connection may be provided through a second non-3GPP access node (e.g., a satellite node). With different NAS connections provided through different access nodes of different technologies, a likelihood that the receiving node (either the wireless terminal 505 in the downlink or the core network node 501 in the uplink) receives all NAS messages in order may be reduced.

Figure 6:
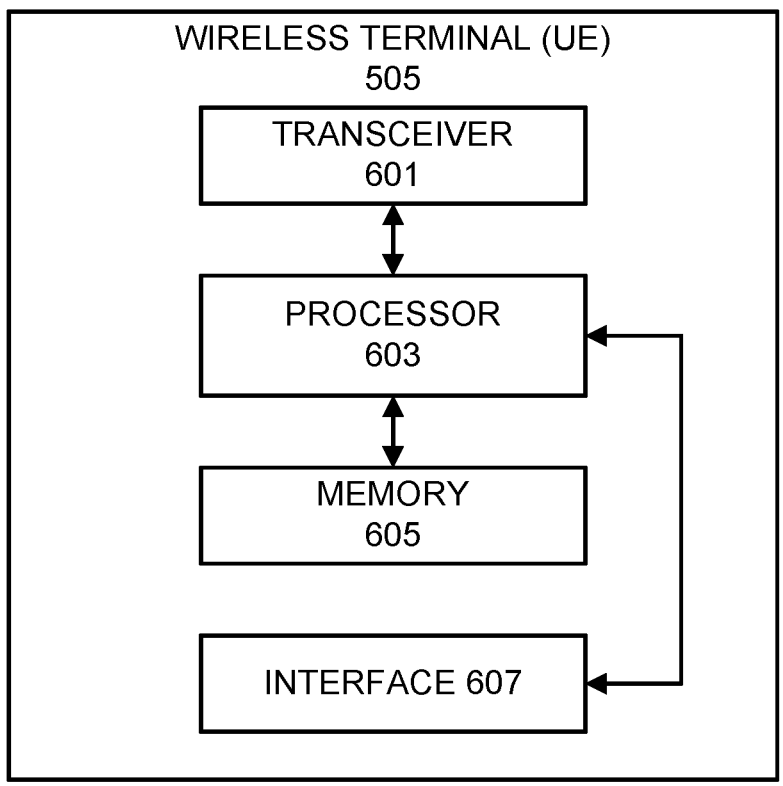
FIG. 6 is a block diagram illustrating elements of a wireless terminal UE according to some embodiments of inventive concepts.

FIG. 6 is a block diagram illustrating elements of a wireless terminal UE 505 (also referred to as a wireless device, a wireless communication device, a wireless communication terminal, user equipment, a user equipment node/terminal/device, etc.) configured to provide wireless communication according to embodiments of inventive concepts. As shown, wireless terminal UE may include a transceiver circuit 601 (also referred to as a transceiver) including a transmitter and a receiver configured to provide uplink and downlink radio communications with a base station(s) of a radio access network. Wireless terminal UE may also include a processor circuit 603 (also referred to as a processor) coupled to the transceiver circuit, and a memory circuit 605 (also referred to as memory) coupled to the processor circuit. The memory circuit 605 may include computer readable program code that when executed by the processor circuit 603 causes the processor circuit to perform operations according to embodiments disclosed herein. According to other embodiments, processor circuit 603 may be defined to include memory so that a separate memory circuit is not required. Wireless terminal UE may also include an interface 607 (such as a user interface) coupled with processor 603, and/or wireless terminal UE may be incorporated in a vehicle. User interface 607 may include, for example, a display (e.g., a touch screen) that provides visual output, a speaker that provides audio output, and/or a user input device (e.g., a touchscreen, keypad, button(s), etc.) that accepts user input.

As discussed herein, operations of wireless terminal UE 505 may be performed by processor 603 and/or transceiver 601. For example, processor 603 may control transceiver 601 to transmit communications through transceiver 601 over a radio interface to an access node and/or to receive communications through transceiver 601 from an access node over a radio interface. Moreover, modules may be stored in memory 605, and these modules may provide instructions so that when instructions of a module are executed by processor 603, processor 603 performs respective operations (e.g., operations discussed below with respect to Example Embodiments).

Figure 7:
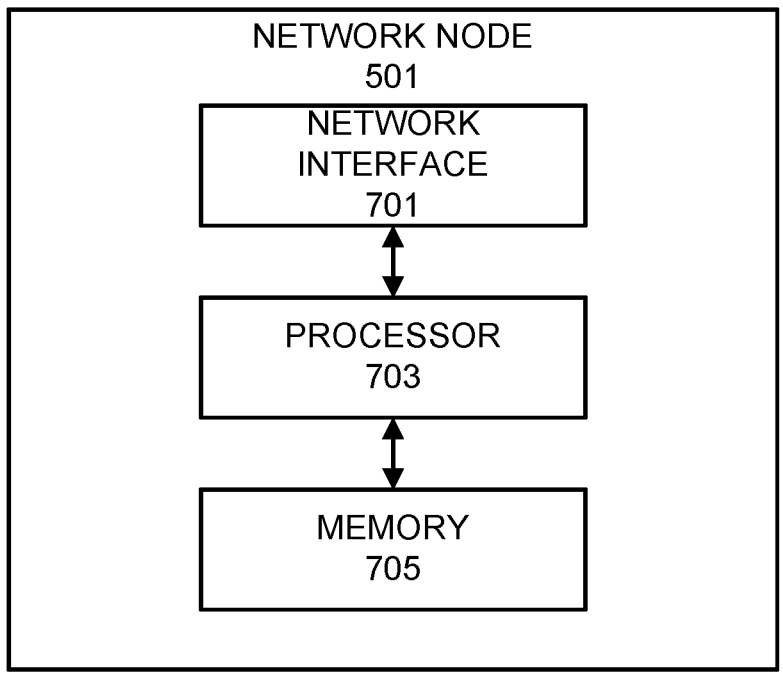
FIG. 7 is a block diagram illustrating elements of a network node according to some embodiments of inventive concepts.

FIG. 7 is a block diagram illustrating elements of a network node (also referred to as a core network node, base station, eNB, eNodeB, gNB, gNodeB, etc.) of a Radio Access Network (RAN) configured to support wireless communication according to embodiments of inventive concepts. As shown, the network node may include a network interface circuit 501 (also referred to as a network interface) including a transmitter and a receiver configured to provide uplink and downlink radio communications with wireless terminals, for example, through access nodes as shown in FIG. 5. The network node may also include a processor circuit 703 (also referred to as a processor) coupled to the network interface circuit, and a memory circuit 705 (also referred to as memory) coupled to the processor circuit. The memory circuit 705 may include computer readable program code that when executed by the processor circuit 703 causes the processor circuit to perform operations according to embodiments disclosed herein. According to other embodiments, processor circuit 703 may be defined to include memory so that a separate memory circuit is not required.

As discussed herein, operations of the network node 501 may be performed by processor 703 and/or network interface 701. For example, processor 703 may control network interface 701 to transmit communications through network interface 701 to one or more access nodes and/or to receive communications through network interface from one or more access nodes as shown in FIG. 5. Moreover, modules may be stored in memory 705, and these modules may provide instructions so that when instructions of a module are executed by processor 703, processor 703 performs respective operations (e.g., operations discussed below with respect to Example Embodiments). While not shown in FIGS. 5 and 7, operations of 3GPP access node 503-1 and network node 501 may be combined by providing a transceiver in network node 501. In such embodiments, the transceiver of network node 501 may provide the 3GPP NAS connection via a direct 3GPP interface with wireless terminal 505. According to such embodiments, processor 703 may control the transceiver to transmit communication through the transceiver over a radio interface to wireless terminal 505 and/or to receive communications through the transceiver from wireless terminal 505.

A general message format and the information element coding for the NAS messages in EPC will now be discussed.

For legacy EPC/LTE systems, TS 24.301 (also referred to as reference [3]) describes a general message format and information element coding for NAS messages. If the NAS message is a security protected NAS message, then the message includes the following parts:
a) protocol discriminator;
b) security header type;
c) message authentication code (MAC);
d) sequence number; and
e) plain NAS message.

The organization of a security protected NAS message is illustrated in the example shown in FIG. 1 which illustrates a message organization for a security protected NAS message.

Bits 5 to 8 of the first octet of every EPS Mobility Management (EMM) message contain the Security header type IE. This IE includes control information related to the security protection of a NAS message. The total size of the Security header type IE is 4 bits. The Security header type IE can take the values shown in the table of FIG. 2 which illustrates security header types of the security protected NAS message of FIG. 1.

The Message authentication code (MAC) information element in FIG. 1 includes/contains the integrity protection information for the message. The MAC IE is included in the security protected NAS message if a valid EPS security context exists and security functions are started.

The Sequence number IE in FIG. 1 includes the NAS message sequence number (SN) which consists of the eight least significant bits of the NAS COUNT for a security protected NAS message.

When a NAS message is to be sent both ciphered and integrity protected, the NAS message is first ciphered and then the ciphered NAS message and the NAS sequence number (NAS COUNT) are integrity protected by calculating the MAC.

When a NAS message is to be sent with only integrity protection and unciphered, the unciphered NAS message and the NAS sequence number are integrity protected by calculating the MAC.

TS 33.401 (also referred to as reference [2]) and TS 24.301 (also referred to as reference [3]) describe that each separate KASME has a distinct pair of NAS COUNTs, one NAS COUNT for uplink and one NAS COUNT for downlink, associated with it.

The NAS COUNTs for a particular KASME are not reset to the start values (that is the NAS COUNTs only have their start value when a new KASME is created). This reduces/prevents a security issue of using the same NAS COUNTs with the same NAS keys, e.g. key stream re-use.

TS 24.301 (also referred to as reference [3]) describes that the sender uses its locally stored NAS COUNT as input to the integrity protection/verification process (also referred to as an integrity protection/verification algorithm) that is used to provide integrity and verification. The receiver uses the NAS sequence number included in the received message (or estimated from the 5 bits of the NAS sequence number received in the message) and an estimate for the NAS overflow counter to form the NAS COUNT input to the integrity verification process.

The integrity protection includes octets 6 to n of the security protected NAS message, i.e. the sequence number IE and the NAS message IE. After successful integrity protection validation, the receiver updates its corresponding locally stored NAS COUNT with the value of the estimated NAS COUNT for this NAS message.

Replay protection should/must assure that one and the same NAS message is not accepted twice by the receiver. Specifically, for a given EPS security context, a given NAS COUNT value shall be accepted at most one time and only if message integrity verifies correctly.

Figure 3A:
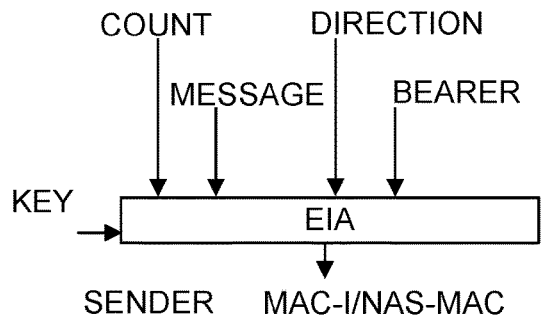
FIGS. 3A and 3B illustrate use of a 128-bit integrity EIA process to authenticate the integrity of messages.
Figure 3B:
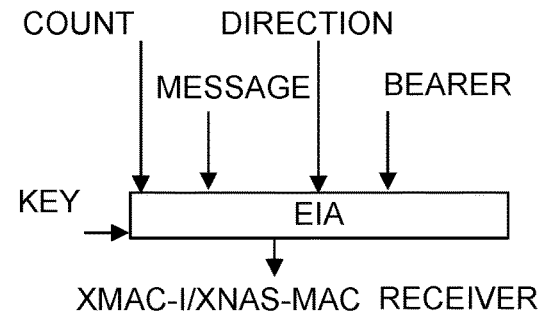

A 128-bit integrity process may be used in EPC/LTE. According to TS 33.401 (also referred to as reference [2]), the input parameters to the 128-bit integrity process are a 128-bit integrity key named KEY, a 32-bit COUNT (i.e. NAS COUNT), a 5-bit bearer identity called BEARER, the 1-bit direction of the transmission (i.e., DIRECTION), and the message itself (i.e., MESSAGE). The DIRECTION bit may/shall be 0 for uplink and 1 for downlink. The bit length of the MESSAGE is LENGTH. FIGS. 3A and 3B illustrate use of the 128-bit integrity process EIA to authenticate the integrity of messages. As shown in FIG. 3A, the sender may derive MAC-I/NAS-MAC, and as shown in FIG. 3B, the receiver may derive XMAC-I/XNAS-MAC.

Based on these input parameters the sender computes a 32-bit message authentication code (MAC-I/NAS-MAC) using the integrity process EIA (also referred to as the integrity algorithm EIA) of FIG. 3A. The message authentication code (MAC) is then appended to the message when sent as shown in FIG. 1. The receiver computes the expected message authentication code (XMAC-I/XNAS-MAC) on the message received (using the integrity process EIA of FIG. 3B, also referred to as an integrity algorithm) in the same way as the sender computed its message authentication code on the message sent and verifies the data integrity of the message by comparing the computed MAC to the received message authentication code, i.e. MAC-I/NAS-MAC.

TS 24.301 (also referred to as reference [3]) describes that the sender uses its locally stored NAS COUNT as input to the ciphering algorithm. The receiver uses the NAS sequence number included in the received message (or estimated from the 5 bits of the NAS sequence number received in the message) and an estimate for the NAS overflow counter to form the NAS COUNT input to the deciphering algorithm.

A 128-bit ciphering algorithm may be used. According to TS 33.401 (also referred to as reference [2]), the input parameters to the ciphering process (also referred to as a ciphering algorithm) are a 128-bit cipher key named KEY, a 32-bit COUNT (i.e., NAS COUNT), a 5-bit bearer identity BEARER, the 1-bit direction of the transmission (i.e., DIRECTION), and the length of the keystream required (i.e., LENGTH). The DIRECTION bit shall be 0 for uplink and 1 for downlink.

Figure 4A:
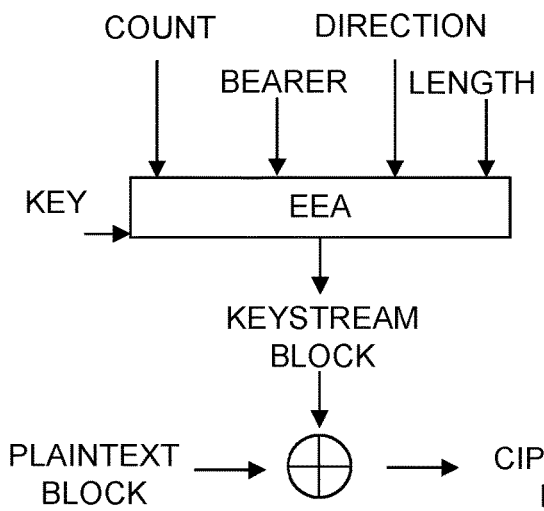
FIGS. 4A and 4B illustrate use of a 128-bit ciphering EEA process to cipher data of messages.
Figure 4B:
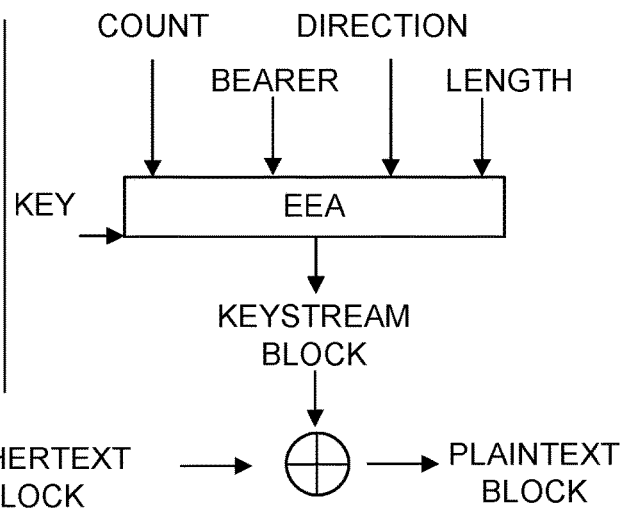

FIGS. 4A and 4B illustrate ciphering of data. Based on the input parameters, the EEA process generates the output keystream block KEYSTREAM which is used to encrypt the input plaintext block PLAINTEXT to produce the output ciphertext block CIPHERTEXT.

The support of multiple NAS connections terminated in the same AMF may give rise to new issues including future proofness, concurrency, agnosticism, and/or flexibility.

Regarding future proofness, the type categorization of accesses into 3GPP and non-3GPP is in fact future proof and can be applied to any new future access technology. Although it seems that there may be no need to support more than two NAS connections, it cannot be precluded with certainty that there will not be any future features or enhancements requiring the support of more than two simultaneous NAS connections, one over 3GPP and two over non-3GPP accesses (e.g., Wifi and satellite). For this reason, it may be better that the new security mechanism is not limited to two connections and that it efficiently supports an arbitrary (up to a limit) number of simultaneous connections.

Regarding concurrency, the introduction of multiple NAS connections may cause concurrency issues since it may now be possible for the system to run in parallel multiple NAS procedures over the different NAS legs. It is conceivable to mandate that the AMF executes the NAS procedures one at a time regardless of the NAS connection so that the underlying assumptions of the legacy security mechanism are preserved. This is not to be expected. For example, a failing NAS procedure on one NAS connection may put on hold all ongoing operations on the other NAS connection, for example, until a failure timer expires. This may be an undesirable design choice. Therefore, it may be better that the new security mechanism supports the parallel execution of NAS procedures on the different connections.

Regarding agnosticism, it is expected that the new security mechanism will provide the same security services regardless of the access type. The security services may include integrity, confidentiality, and replay protection. The security services should be provided in a transparent manner to the access type, in line with the general design principle of an access agnostic 5G architecture.

Regarding flexibility, the new feature of multiple NAS connections may give rise to new scenarios which were not possible in legacy Systems. For example, one NAS connection over an access type could be constantly active while another one over a different access type, abusing terminology, flickers. More precisely, the UE may be registered over one NAS leg while oscillating between the two registration states on the other leg. This is not to mention, that the UE could meanwhile perform several handovers involving AMF changes. Therefore, the new security mechanism may desirably be flexible enough to support such mobility scenarios.

According to some embodiments of inventive concepts, methods may be provided to secure parallel NAS connections. Such methods may be based on partly sharing the security context so that the master key (KASME-equivalent in 5G) is shared for different NAS connections with the same wireless terminal, while for each NAS connection with the same wireless terminal there is a dedicated separate pair of NAS COUNTs based on use of a NAS parameter called NAS CONN ID (NAS Connection Identification) to identify each NAS connection with the same wireless terminal.

According to some embodiments, disclosed methods/devices may address issues relating to future proofness, concurrency, agnosticism, and flexibility, while providing a similar/same level of security services and protection relative to NAS connection as in legacy systems.

Regarding multiple NAS connections, the following assumptions may be made.

First, there may be an AMF-specific key denoted by KAMF which is the KASME-equivalent in 5G Systems. This key is established via a successful authentication and is used to derive the NAS protocol protection keys, i.e. KNASint and KNASenc.

Second, the system may provide/guarantee the in-order delivery of the NAS messages on each leg (connection). More particularly, the underlying NAS transport assumptions from legacy systems may still apply but per NAS connection, but this does not preclude the parallel executions of NAS procedures on different connections.

Third, the choice of the cryptographic processes (also referred to as cryptographic algorithms) may apply to all the NAS connections indiscriminately. In other words, it may be assumed that there is no NAS connection-specific security negotiation. It is expected that the negotiation takes place once during the establishment and activation of the AMF key, e.g. the NAS SMC procedure-equivalent in 5G. The NAS SMC (Security Mode Command) procedure is described in detail in TS 33.401 (also referred to as reference [2]).

Figure 8:
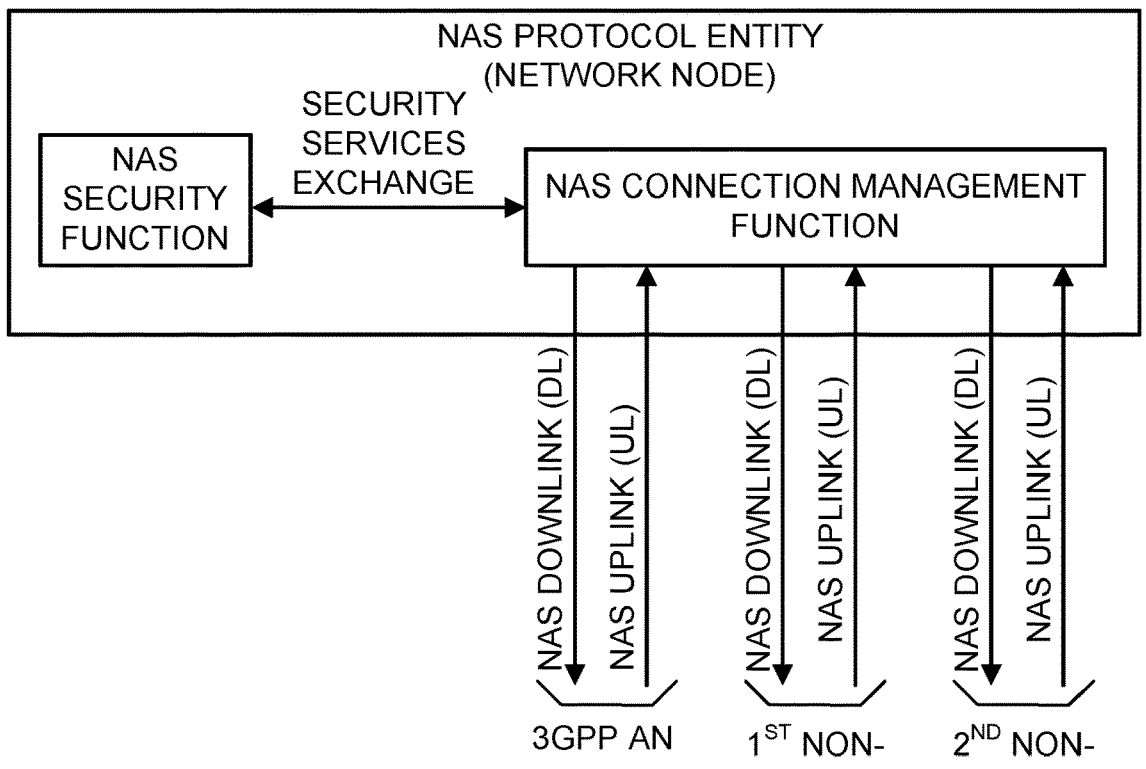
FIGS. 8 and 9 and block diagrams illustrating NAS Security Functions at the network node of FIGS. 5 and 7 and at the wireless terminal of FIGS. 5 and 6, respectively, according to some embodiments of inventive concepts.
Figure 9:
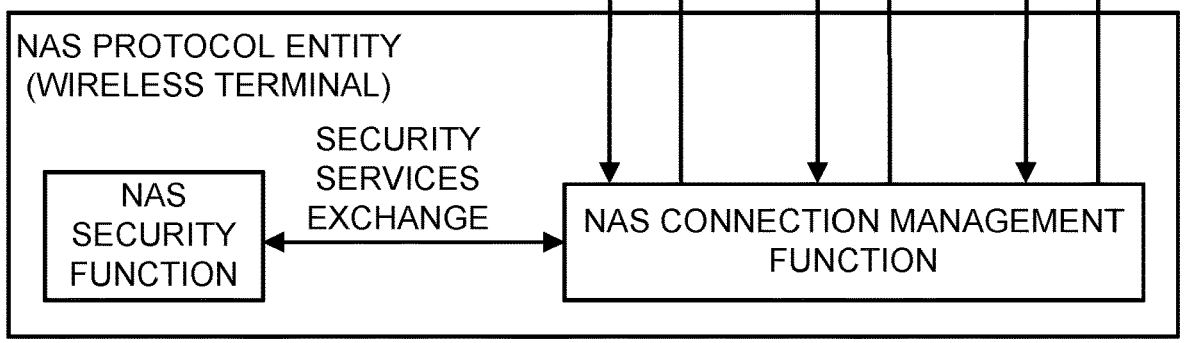

It may also be assumed that the NAS security is an additional function of NAS providing security services to the NAS protocol management entity as illustrated in FIGS. 8 and 9. Although, this could be left up to the implementation, the reference models of FIGS. 8 and 9 are provided as examples. For the reception of uplink NAS messages and transmission of downlink NAS messages, operations of the NAS Protocol Entity (including the NAS Security Function and the NAS Connection Management Function) of FIG. 8 may be performed by processor 703 of network node 501. For the reception of downlink NAS messages and transmission of uplink NAS messages, operations of the NAS Protocol Entity (including the NAS Security Function and the NAS Connection Management Function) of FIG. 9 may be performed by processor 603 of wireless terminal 505 of FIG. 6.

For example, NAS security services may be provided by a standalone security function which interacts with the other NAS protocol entities or functions. For example, the NAS connection management function may forward protected messages received on the uplink to the security function which performs the checks and cryptographic operations and returns back the outcome (e.g., whether integrity check fails or passes, and/or whether the message is deciphered, etc.). When a message is to be protected on the downlink, the NAS connection management function provides the payload to the security function which performs the necessary operations and returns the protected message.

FIGS. 8 and 9 illustrate NAS Security Functions at a core network node and at a wireless terminal, respectively.

For 5G, it is expected that the NAS security context may include the AMF key KAMF, the derived protection keys KNASint and KNASenc, and the key set identifier eKSI-equivalent in 5G. According to some embodiments of the present disclosure, a separate pair of NAS COUNTs may be used for each NAS connection with a wireless terminal in this NAS security context.

As discussed above, for each NAS connection, a separate pair of NAS COUNTs, one for each direction, may be used/maintained. Since the security keys are shared and to reduce/avoid key stream reuse, methods for cryptographic separation may be used/required. For this purpose, a NAS connection-specific parameter may be introduced, and this NAS connection-specific parameter may be referred to as the NAS connection identifier and denoted by NAS CONN ID.

The NAS CONN ID is a number that is incremented each time a new NAS connection is set up for a wireless terminal. In the security context, each NAS COUNT pair is associated with a unique NAS CONN ID value. The new parameter is used as a differentiator when interacting with the NAS security function to indicate which NAS connection each message belongs to. To keep track of unallocated NAS CONN ID values, an additional parameter may be used/needed. This new parameter, denoted by NEXT NAS CONN ID may also be part of the security context. The NEXT NAS CONN ID parameter is initially set to 0 and is incremented whenever a new NAS connection is set up for a wireless terminal. Each time a new NAS connection is created for a wireless terminal, it is allocated as an identifier the current NEXT NAS CONN ID value. More particularly, a new NAS COUNT pair is created and is associated with a NAS CONN ID whose value is set to the current NEXT NAS CONN ID value. The NEXT NAS CONN ID value is then incremented. The NAS Connection Identification NAS CONN ID can thus be used as an input (directly or indirectly) for authentication and/or ciphering/deciphering processes.

According to some embodiments of inventive concepts, when a new NAS COUNT pair is created, the values of the counters are set to 0. The NAS CONN ID may be an 8-bit value that is used to pad the NAS COUNT 24-bit internal representation when constructing the input to the NAS ciphering/deciphering and/or integrity processes. In legacy systems, the padding may always be set to 0 as described in TS 24.301 (also referred to as reference [3]). Since each NAS connection is identified by a unique NAS CONN ID, the padding provides/guarantees cryptographic separation for the messages travelling over different NAS connections.

FIGS. 10A and 10B illustrate use of the integrity process EIA (also referred to as an integrity algorithm EIA) to authenticate the integrity of messages using the NAS CONN ID on the sender and receiver sides. By incorporating the NAS Connection Identification NAS CONN ID in the COUNT input, separation may be provided for authentication of different NAS connections for the same wireless terminal. The COUNT input, for example, may be a 32 bit value generated as a concatenation of the 8 bit NAS CONN ID for the NAS connection and the 24 bit NAS COUNT for the NAS connection (i.e., COUNT (32 bit)=NAS CONN ID (8 bit)||NAS COUNT (24 bit)). FIG. 10A thus illustrates use of the NAS CONN ID to derive MAC-I/NAS-MAC on the transmitter side, and FIG. 10B illustrates use of the NAS CONN ID to derive XMAC-I/XNAS-MAC on the receiver side.

FIGS. 11A and 11B illustrate the use of the ciphering/deciphering algorithm EEA to cipher/decipher messages using the NAS CONN ID on the sender and receiver sides. By incorporating the NAS Connection Identification NAS CONN ID in the COUNT input, separation may be provided for ciphering/deciphering different NAS connections for the same wireless terminal. The COUNT input, for example, may be a 32 bit value generated as a concatenation of the 8 bit NAS CONN ID for the NAS connection and the 24 bit NAS COUNT for the NAS connection (i.e., COUNT (32 bit)=NAS CONN ID (8 bit) II NAS COUNT (24 bit)). FIG. 11A thus illustrates use of the NAS CONN ID to cipher the plaintext on the transmitter side, and FIG. 11B illustrates use of the NAS CONN ID to decipher the cipher text on the receiver side.

According to some other embodiments, the NAS CONN ID may be a 5-bit value that is used as the BEARER input for authentication and/or ciphering/deciphering processes as discussed below.

FIGS. 12A and 12B illustrate the use of the integrity algorithm EIA to authenticate the integrity of messages using the NAS CONN ID on the sender and receiver sides. By using the NAS Connection Identification NAS CONN ID as the BEARER input, separation may be provided for authentication of different NAS connections for the same wireless terminal. FIG. 12A thus illustrates use of the NAS CONN ID as the BEARER input to derive MAC-I/NAS-MAC on the transmitter side, and FIG. 12B illustrates use of the NAS CONN ID as the BEARER input to derive XMAC-I/XNAS-MAC on the receiver side.

FIGS. 13A and 13B illustrate the use of the ciphering/deciphering process EEA to cipher/decipher messages using the NAS CONN ID on the sender and receiver sides. By using the NAS Connection Identification NAS CONN ID as the BEARER input, separation may be provided for ciphering/deciphering of different NAS connections for the same wireless terminal. FIG. 13A thus illustrates use of the NAS CONN ID as the BEARER input to cipher the plain text on the transmitter side, and FIG. 13B illustrates use of the NAS CONN ID as the BEARER input to decipher the cipher text on the receiver side.

Operations providing integrity authentication and/or ciphering/deciphering of FIGS. 10A-B, 11A-B, 12A-B, and/or 13A-B will now be discussed with respect to the flow chart of FIGS. 17A and 17B.

Operations of a communication node will now be discussed with reference to the flow chart of FIG. 17A and the modules of FIG. 17B. For example, modules of FIG. 17B may be stored in memory of the communication node (e.g., wireless terminal memory 605 of FIG. 6 if the communication node is a wireless terminal, or network node memory 705 of FIG. 7 if the communication node is a network node), and these modules may provide instructions so that when the instructions of a module are executed by the communication node processor (e.g., wireless terminal processor 603 if the communication node is a wireless terminal, or network node processor 705 if the communication node is a network node), the processor performs respective operations of the flow chart of FIG. 17A.

As discussed above with respect to FIG. 5, first and second NAS connections may be provided between first and second communication nodes, such as between wireless terminal 505 and network node 501 (e.g., a core network node). The communication node processor may provide a first NAS connection identification for a first NAS connection between the first and second communication nodes at block 1711 (e.g., using first identification module 1751). The communication node processor may also provide a second NAS connection identification for a second NAS connection between the first and second communication nodes at block 1713 (e.g., using second identification module 1753). Moreover, the first and second NAS connection identifications are different, and the first and second NAS connections are different.

For a communication over the first NAS connection at block 1717, the communication node processor may communicate a first NAS message between the first and second communication nodes over the first NAS connection (e.g., using first communication module 1757). More particularly, communicating the first NAS message may include at least one of performing integrity protection for the first NAS message using the first NAS connection identification and/or performing confidentiality protection for the first NAS message using the first NAS connection identification.

For a communication over the second NAS connection at block 1719, the communication node processor may communicate a second NAS message between the first and second communication nodes over the second NAS connection (e.g., using second communication module 1759). More particularly, communicating the second NAS message may include at least one of performing at least one of performing integrity protection for the second NAS message using the second NAS connection identification and/or performing confidentiality protection for the second NAS message using the second NAS connection identification.

The first and second NAS connections share a master key of a NAS security context. Moreover, communicating the first NAS message may include at least one of performing integrity protection for the first NAS message using the first NAS connection identification and the master key and/or performing confidentiality protection for the first NAS message using the first NAS connection identification and the master key. Similarly, communicating the second NAS message may include at least one of performing integrity protection for the second NAS message using the second NAS connection identification and the master key and/or performing confidentiality protection for the second NAS message using the second NAS connection identification and the master key.

Figures 17A, 17B:
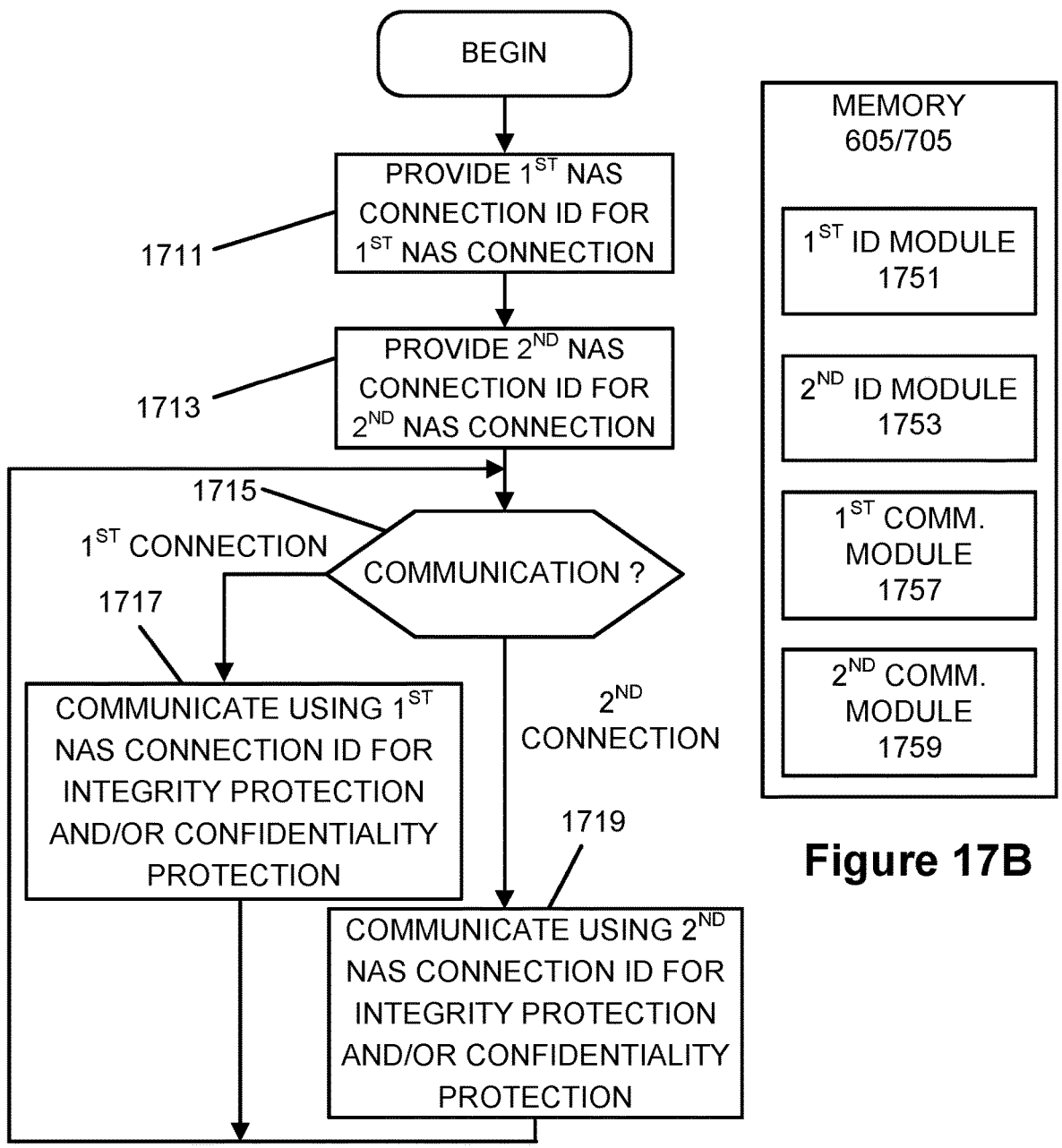
FIGS. 17A and 18A are flow charts illustrating operations of communicating NAS messages over multiple NAS connections according to some embodiments of inventive concepts.
FIGS. 17B and 18B are block diagrams illustrating memory modules corresponding to operations of FIGS. 17A and 18A respectively, according to some embodiments of inventive concepts.

Operations of FIG. 17A may be performed by a communication node that is transmitting NAS messages (e.g., wireless terminal 505 in the uplink, or network node 501 in the downlink). As discussed above, the first and second NAS connections may share a master key of a NAS security context. At block 1717, communicating the first NAS message may include performing integrity protection by generating a first message authentication code based on the first NAS connection identification, the master key, and the first NAS message, and transmitting the first NAS message with the first message authentication code over the first NAS connection to the second communication node. At block 1719, communicating the second NAS message may include performing integrity protection for the second NAS message by generating a second message authentication code based on the second NAS connection identification, the master key, and the second NAS message, and transmitting the second NAS message with the second message authentication code over the second NAS connection to the second communication node.

According to some embodiments for the transmitting node, the first NAS connection identification may be concatenated with a first NAS count for the first NAS message, the concatenation of the first NAS connection identification and the first NAS count may be provided as an input to generate the first message authentication code, the second NAS connection identification may be concatenated with a second NAS count for the second NAS message, and the concatenation of the second NAS connection identification and the second NAS count may be provided as an input to generate the second message authentication code. According to some other embodiments for the transmitting node, the first NAS connection identification may be provided as an input to generate the first message authentication code, and the second NAS connection identification may be provided as an input to generate the second message authentication code. According to still other embodiments for the transmitting node, the master key and the first NAS connection identification may be used to derive a first integrity protection key used to generate the first message authentication code, and the master key and the second NAS connection identification may be used to derive a second integrity protection key used to generate the second message authentication code. Moreover, performing integrity protection for the first NAS message may include performing integrity protection for the first NAS message using a 5G compatible EIA integrity protection interface, and performing integrity protection for the second NAS message may include performing integrity protection for the second NAS message using the 5G compatible EIA integrity protection interface.

Operations of FIG. 17A may be performed by a communication node that is transmitting NAS messages (e.g., wireless terminal 505 in the uplink, or network node 501 in the downlink). As discussed above, the first and second NAS connections may share a master key of a NAS security context. At block 1717, communicating the first NAS message may include performing confidentiality protection for the first NAS message by ciphering the first NAS message using the first NAS connection identification and the master key to provide a first ciphered NAS message, and transmitting the first ciphered NAS message over the first NAS connection to the second communication node. At block 1719, communicating the second NAS message may include performing confidentiality protection for the second NAS message by ciphering the second NAS message using the second NAS connection identification and the master key to provide a second ciphered NAS message, and transmitting the second ciphered NAS message over the second NAS connection to the second communication node.

According to some embodiments for the transmitting node, the first NAS connection identification may be concatenated with a first NAS count for the first NAS message, the concatenation of the first NAS connection identification and the first NAS count may be provided as an input to generate the first ciphered NAS message, the second NAS connection identification may be concatenated with a second NAS count for the second NAS message, and the concatenation of the second NAS connection identification and the second NAS count may be provided as an input to generate the second ciphered NAS message. According to some other embodiments of the transmitting node, the first NAS connection identification may be provided as an input to generate the first ciphered NAS message, and the second NAS connection identification may be provided as an input to generate the second ciphered NAS message. According to still other embodiments of the transmitting node, the master key and the first NAS connection identification may be used to derive a first ciphering key that is used to generate the first ciphered NAS message, and the master key and the second NAS connection identification may be used to derive a second ciphering key that is used to generate the second ciphered NAS message. The ciphering the first NAS message may include ciphering the first NAS message using EEA ciphering, and the ciphering the second NAS message comprises ciphering the second NAS message using the EEA ciphering. Moreover, performing confidentiality protection for the first NAS message may include performing confidentiality protection for the first NAS message using a 5G compatible EEA ciphering interface, and performing confidentiality protection for the second NAS message may include performing confidentiality protection for the second NAS message using the 5G compatible EEA ciphering interface.

Operations of FIG. 17A may be performed by a communication node that is receiving NAS messages (e.g., a wireless terminal on the downlink, or a network node of the uplink). As discussed above, the first and second NAS connections may share a master key of a NAS security context. At block 1715, communicating the first NAS message may include receiving the first NAS message with a first message authentication code over the first NAS connection from the second communication node, performing the integrity protection of the first NAS message by generating a first derived message authentication code for the first NAS message based on the first NAS connection identification, the master key, and the first NAS message, and processing the first NAS message responsive to the first message authentication code and the first derived message authentication code matching. At block 1719, communicating the second NAS message may include receiving the second NAS message with a second message authentication code over the second NAS connection from the second communication node, performing the integrity protection for the second NAS message by generating a second derived message authentication code for the second NAS message based on the second NAS connection identification, the master key, and the second NAS message, and processing the second NAS message responsive to the second message authentication code and the second derived message authentication code matching.

According to some embodiments for the receiving node, the first NAS connection identification may be concatenated with a first NAS count for the first NAS message, the concatenation of the first NAS connection identification and the first NAS count may be provided as an input to generate the first derived message authentication code, the second NAS connection identification may be concatenated with a second NAS count for the second NAS message, and the concatenation of the second NAS connection identification and the second NAS count may be provided as an input to generate the second derived message authentication code. According to some other embodiments for the receiving node, the first NAS connection identification may be provided as an input to generate the first derived message authentication code, and the second NAS connection identification may be provided as an input to generate the second derived message authentication code. According to still other embodiments for the receiving node, the master key and the first NAS connection identification may be used to derive a first integrity protection key used to generate the first derived message authentication code, and the master key and the second NAS connection identification may be used to derive a second integrity protection key used to generate the second derived message authentication code. Moreover, performing integrity protection for the first NAS message may include performing integrity protection for the first NAS message using a 5G compatible EIA integrity protection interface, and performing integrity protection for the second NAS message may include performing integrity protection for the second NAS message using the 5G compatible EIA integrity protection interface.

Operations of FIG. 17A may be performed by a communication node that is receiving NAS messages (e.g., a wireless terminal on the downlink, or a network node of the uplink). As discussed above, the first and second NAS connections may share a master key of a NAS security context. At block 1717, communicating the first NAS message may include receiving a first ciphered NAS message over the first NAS connection from the second communication node, performing confidentiality protection for the first NAS message by deciphering the first ciphered NAS message using the first NAS connection identification and the master key to provide a first deciphered NAS message, and processing the first deciphered NAS message. At block 1719, communicating the second NAS message may include receiving a second ciphered NAS message over the second NAS connection from the second communication node, performing confidentiality protection for the second NAS message by deciphering the second ciphered NAS message using the second NAS connection identification and the master key to provide a second deciphered NAS message, and processing the second deciphered NAS message.

According to some embodiments for the receiving node, the first NAS connection identification may be concatenated with a first NAS count for the first NAS message, the concatenation of the first NAS connection identification and the first NAS count may be provided as an input to generate the first deciphered NAS message, the second NAS connection identification may be concatenated with a second NAS count for the second NAS message, and the concatenation of the second NAS connection identification and the second NAS count may be provided as an input to generate the second ciphered NAS message. According to some other embodiments for the receiving node, the first NAS connection identification may be provided as an input to generate the first deciphered NAS message, and the second NAS connection identification may be provided as an input to generate the second deciphered NAS message. According to still other embodiments for the receiving node, the master key and the first NAS connection identification may be used to derive a first deciphering key used to generate the first deciphered NAS message, and the master key and the second NAS connection identification may be used to derive a second deciphering key used to generate the second deciphered NAS message. Moreover, performing confidentiality protection for the first NAS message may include performing confidentiality protection for the first NAS message using a 5G compatible EEA deciphering interface, and performing confidentiality protection for the second NAS message may include performing confidentiality protection for the second NAS message using the 5G compatible EEA deciphering interface.

In embodiments of FIG. 17A, the first NAS connection may be provided through a 3GPP access node between the first and second communication nodes, and the second NAS connection may be provided through a non-3GPP access node between the first and second communication nodes; or the first NAS connection may be provided through a non-3GPP access node between the first and second communication nodes and the second NAS connection may be provided through a 3GPP access node between the first and second communication nodes. For example, the 3GPP access node may include a radio access network base station, and the non-3GPP access node may include at least one of a WiFi access node and/or a satellite access node.

Moreover, the first and second NAS connections of FIG. 17A may be maintained concurrently between the first and second communication nodes. In addition, a Packet Data Unit (PDU) session may be established based on the first and second NAS messages to communicate user plane data between the first and second communication nodes.

Various operations of FIG. 17A and/or modules of FIG. 17B may be optional with respect to some embodiments of communication nodes and related methods. Regarding methods of example embodiment 1 (set forth below), for example, operations of block 1715 of FIG. 17B may be optional.

According to some other embodiments, the NAS COUNT domain may be partitioned depending on the number of running NAS connections as described below.

A difference relative to embodiments discussed above with respect to FIGS. 10A-B, 11A-B, 12A-B, AND 13A-B is that the NAS CONN ID may not constantly increase, and in fact, during a life time of the KAMF key, it is possible that different NAS connections are assigned the same NAS CONN ID value.

In such embodiments, a new parameter denoted by NAS CONN NUM may be used to keep track of the number of running NAS connections for a wireless terminal. In addition, a special pair of NAS COUNTs may be used to keep track of the maximal values of the COUNTS on the uplink and downlink across all available NAS COUNT pairs. This parameter may be referred to as the MAX NAS COUNTs pair. Initially, all the parameters are set to 0. When a new NAS connection is set up for a wireless terminal, the new NAS connection is assigned the current NAS CONN NUM value as the NAS CONN ID. A new pair of NAS COUNTs is created with their value set to the current NAS COUNT MAX values added the connection NAS CONN ID. For all existing connections, the NAS COUNT values are adjusted to the current NAS COUNT MAX values added the corresponding NAS CONN ID value. Finally, the NAS CONN NUM is incremented.

In case a NAS connection is terminated, then the NAS CONN NUM is decremented, all the connections with an identifier over that of the torn down connection are decremented, and all the NAS COUNTS are adjusted like in the connection addition case. Whenever a NAS message is successfully processed (for transmission or upon a reception), then for that NAS connection, the NAS COUNT value is incremented by NAS COUNT NUM. Intuitively, the NAS CONN NUM is used as the increment for all the NAS COUNTS. However, to reduce/prevent overlap, each time a connection is established or torn down, the NAS COUNTs are readjusted based on the current NAS COUNT MAX values and the corresponding (possibly readjusted) NAS CONN IDs.

This embodiment may not provide/guarantee an efficient/good use of the NAS COUNT domain. In case one NAS connection is more active than the others (driving the MAX NAS COUNT values), then termination of the more active NAS connection may trigger a leap forward in the NAS COUNT values of the remaining connections and thus a waste of NAS COUNT values.

Operations of a communication node will now be discussed with reference to the flow chart of FIG. 18A and the modules of FIG. 18B. For example, modules of FIG. 18B may be stored in memory of the communication node (e.g., wireless terminal memory 605 of FIG. 6 if the communication node is a wireless terminal, or network node memory 705 of FIG. 7 if the communication node is a network node), and these modules may provide instructions so that when the instructions of a module are executed by the communication node processor (e.g., wireless terminal processor 603 if the communication node is a wireless terminal, or network node processor 705 if the communication node is a network node), the processor performs respective operations of the flow chart of FIG. 18A.

The communication node processor may provide a first NAS connection between the first and second communication nodes at block 1801 (e.g., using first NAS connection module 1851), and the communication node processor may provide a second NAS connection between the first and second communication nodes at block 1803 (e.g., using second NAS connection module 1853). Moreover, the first and second NAS connections may be different.

The communication node processor may allocate a NAS count domain at block 1805 (e.g., using allocation module 1855) so that a first portion of the NAS count domain is allocated for NAS messages communicated over the first NAS connection and so that a second portion of the NAS count domain is allocated for NAS messages communicated over the second NAS connection. Moreover, the first and second portions of the NAS count domain may be mutually exclusive.

For a NAS communication at block 1807, the communication node processor may determine which connection is used at block 1809. The communication node processor may communicate NAS messages over the first NAS connection at block 1811 using a lowest NAS count value from the first portion of the NAS count domain that has not been previously used for each NAS message communicated over the first NAS connection (e.g., using first NAS communication module 1851). The communication node processor may communicate NAS messages over the second NAS connection at block 1813 using a lowest NAS count value from the second portion of the NAS count domain that has not been previously used for each NAS message communicated over the second NAS connection (e.g., using second NAS communication module 1853).

NAS count values of the first and second portions of the NAS count domain may be interleaved. With two NAS connections, the first portion of the NAS count domain may include even NAS count values, and the second portion of the NAS count domain may include odd NAS count values. With such a partitioning of the NAS count domain, NAS messages communicated over the first NAS connection may be assigned sequence numbers 0, 2, 4, 6, 8, etc. from the first portion of the NAS Count domain, and NAS messages communicated over the second NAS connection may be assigned sequence numbers 1, 3, 5, 7, etc. from the second portion of the NAS count domain. Moreover, if one of the NAS connections is more active, more sequence numbers may be assigned from one portion of the NAS Count domain than from the other portion of the NAS count domain. By way of example, if 8 NAS messages are transmitted over the first NAS connection and 3 NAS messages are transmitted over the second NAS connection, sequence numbers 0, 2, 4, 6, 8, 10, 12, and 14 may be respectively assigned to the NAS messages transmitted over the first NAS connection, sequence numbers 1, 3, and 5 may be respectively assigned to the NAS messages transmitted over the second NAS connection, and the NAS Count Max value will be 14.

Operations of blocks 1807, 1809, 1811, and 1813 may be repeated at block 1815 until a change in connections occurs. At block 1816, for example, the communication node processor may provide a third NAS connection between the first and second communication nodes (e.g., using third NAS connection module 1856). The first and third NAS connections are different, and the second and third NAS connections re different. Moreover, the communication node processor may reallocate the NAS count domain at block 1817 (e.g., using reallocation module 1857). Upon reallocation, a first portion of the NAS count domain may be allocated for NAS messages communicated over the first NAS connection, a second portion of the NAS count domain may be allocated for NAS messages communicated over the second NAS connection, and a third portions of the NAS count domain may be allocated for NAS messages communicated over the third NAS connection, with the first, second, and third portions of the NAS count domain are mutually exclusive.

Carrying on with the example above, if the NAS Count Max value is 18, the reallocation may occur for the NAS Count values greater than 14, so that NAS count values 7, 9, 11, and 13 are unused. According to such an example, after reallocation, the first portion of the NAS count domain may include NAS count values greater than 14 that are divisible by 3 (e.g., 15, 18, 21, 24, etc.), the second portion of the NAS count domain may include NAS count values greater than 14 for which division by 3 provides a reminder of 1 (e.g., 16, 19, 22, 25, etc.), and the third portion of the NAS count domain may include NAS count values greater than 14 for which division by 3 provides a remainder of 2 (e.g., 17, 20, 23, 26, etc.).

For a NAS communication at block 1819, the communication node processor may determine which connection is used at block 1821. The communication node processor may communicate NAS messages over the first NAS connection at block 1831 using a lowest NAS count value from the first portion of the NAS count domain that has not been previously used for each NAS message communicated over the first NAS connection (e.g., using first NAS communication module 1861). The communication node processor may communicate NAS messages over the second NAS connection at block 1833 using a lowest NAS count value from the second portion of the NAS count domain that has not been previously used for each NAS message communicated over the second NAS connection (e.g., using second NAS communication module 1863). The communication node processor may communicate NAS messages over the third NAS connection at block 1835 using a lowest NAS count value from the third portion of the NAS count domain that has not been previously used for each NAS message communicated over the third NAS connection (e.g., using second NAS communication module 1865).

Figure 18A:
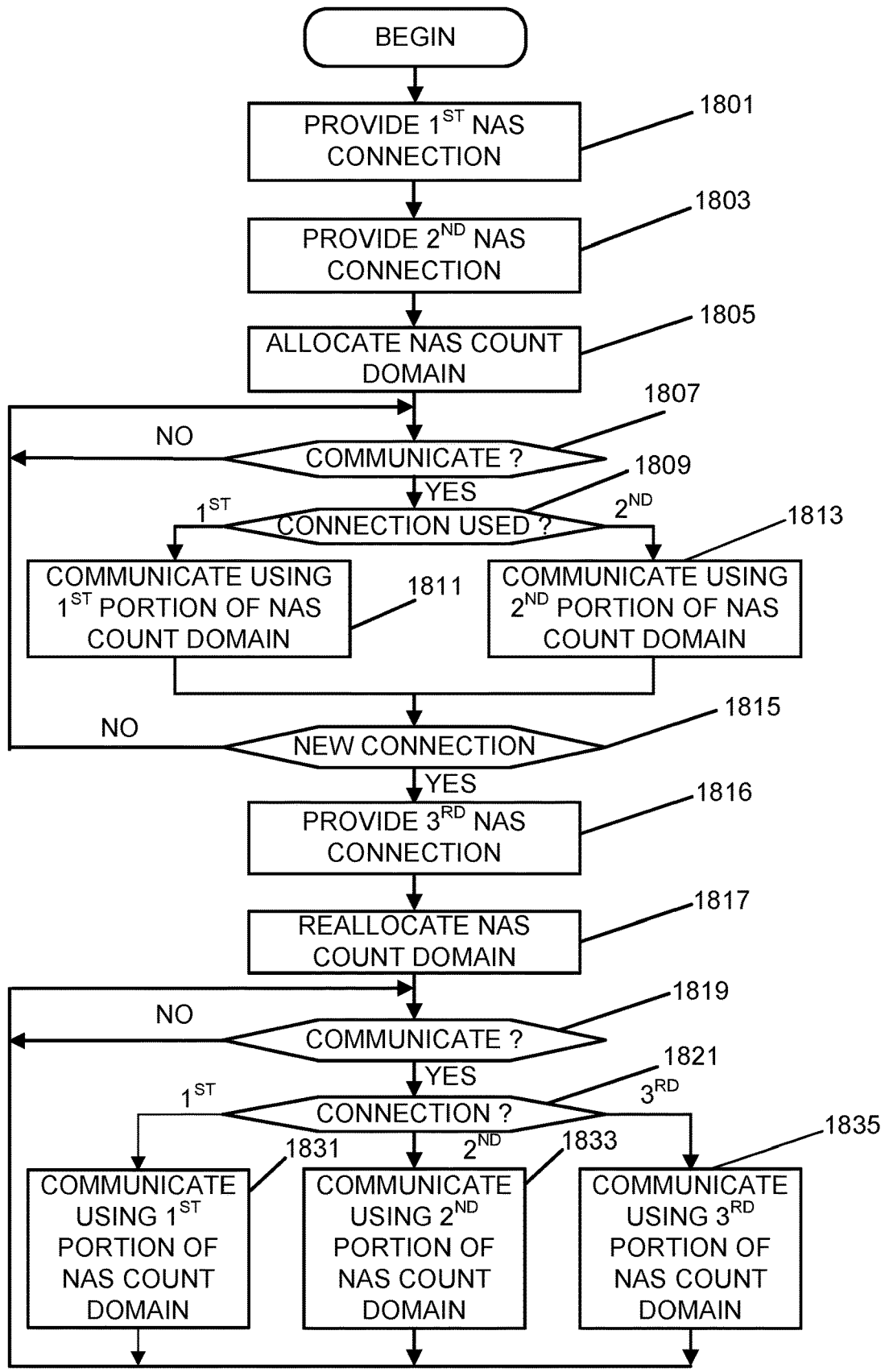

According to some embodiments of FIG. 18A, the first communication node may be a network node, the second communication node may be a wireless terminal, and the NAS count domain may be an uplink NAS count domain. Accordingly, communicating NAS messages over the first NAS connection may include receiving NAS messages over the first NAS connection, and communicating NAS messages over the second NAS connection may include receiving NAS messages over the second NAS connection.

According to some other embodiments of FIG. 18A, the first communication node may be a network node, the second communication node may be a wireless terminal, and the NAS count domain may be a downlink NAS count domain. Accordingly, communicating NAS messages over the first NAS connection may include transmitting NAS messages over the first NAS connection, and communicating NAS messages over the second NAS connection may include transmitting NAS messages over the second NAS connection.

According to still other embodiments of FIG. 18A, the first communication node may be a wireless terminal, the second communication node may be a network node, and the NAS count domain is an uplink NAS count domain. Accordingly, communicating NAS messages over the first NAS connection may include transmitting NAS messages over the first NAS connection, and communicating NAS messages over the second NAS connection may include transmitting NAS messages over the second NAS connection.

According to yet other embodiments of FIG. 18A, the first communication node may be a wireless terminal, the second communication node may be a network node, and the NAS count domain may be a downlink NAS count domain. Accordingly, communicating NAS messages over the first NAS connection may include receiving NAS messages over the first NAS connection, and communicating NAS messages over the second NAS connection may include receiving NAS messages over the second NAS connection.

In embodiments of FIG. 18A, the first NAS connection may be provided through a 3GPP access node between the first and second communication nodes and the second NAS connection may be provided through a non-3GPP access node between the first and second communication nodes, or the first NAS connection may be provided through a non-3GPP access node between the first and second communication nodes and the second NAS connection may be provided through a 3GPP access node between the first and second communication nodes.

In addition, communicating NAS messages over the first NAS connection may include at least one of performing integrity protection by generating message authentication codes using respective NAS count values from the first portion of the NAS count domain and/or performing confidentiality protection using respective NAS count values from the first portion of the NAS count domain. Similarly, communicating NAS messages over the second NAS connection may include at least one of performing integrity protection by generating message authentication codes using respective NAS count values from the second portion of the NAS count domain and/or performing confidentiality protection using respective NAS count values from the second portion of the NAS count domain.

Moreover, the first and second NAS connections of FIG. 18A may be maintained concurrently between the first and second communication nodes. In addition, a Packet Data Unit (PDU) session may be established based on the first and second NAS messages to communicate user plane data between the first and second communication nodes.

Figure 18B:
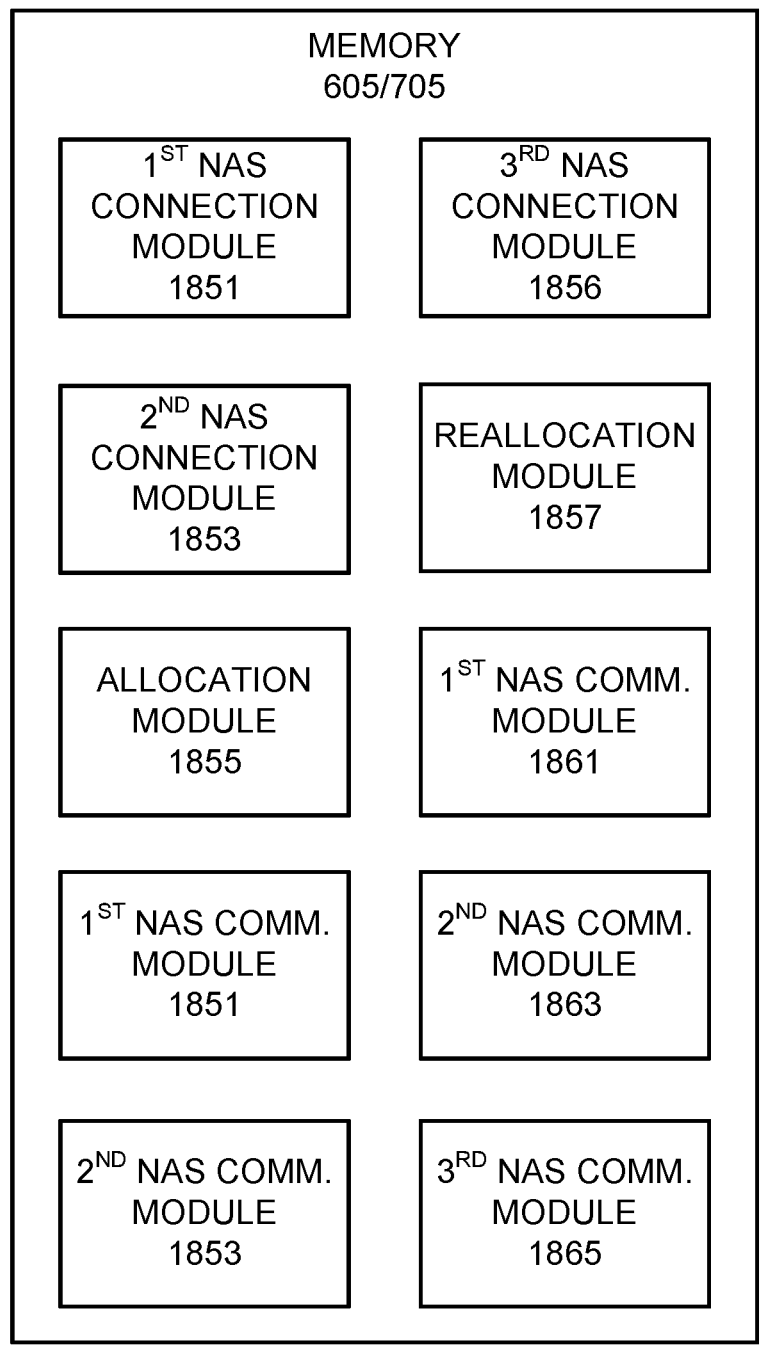

Various operations of FIG. 18A and/or modules of FIG. 18B may be optional with respect to some embodiments of communication nodes and related methods. Regarding methods of example embodiment 1 (set forth below), for example, operations of blocks 1807, 1809, 18015, 1816, 1817, 1819, 1821, 1831, 1833, and 1835 of FIG. 18A may be optional, and modules 1856, 1857, 1861, 1863, and 1865 may be optional.

According to some other embodiments of inventive concepts, cryptographic separation may be provided at the level of the keys. NAS protection keys may be derived in legacy systems as described in TS 33.401 (also referred to as reference [2]).

In general, all key derivations (including input parameter encoding) for LTE may be performed using the key derivation function (KDF) specified in TS 33.220 (also referred to as reference [4]). The KDF takes in as input a key and a string S. The derived key is obtained by applying the HMAC-SHA-256 (described in RFC 2104, also referred to as reference [5]) to the input key and string S. The string S is constructed by concatenating a distinguisher parameter referred to as FC and a set of other parameters and their respective lengths: S=FC||P0||L0||P1||L1||P2||L2||P3||L3|| . . . ||Pn||Ln, where Pi (i from 0 to n) is a parameter and Li is its length in octets.

According to clause A.7 of TS 33.401 (also referred to as reference [2]), when deriving keys for NAS integrity and NAS encryption processes (also referred to as algorithms)

from KASME and process/algorithm types and IDs, the following parameters may/shall be used to form the string S.

FC=0x15
P0=process type distinguisher
L0=length of process type distinguisher (i.e. 0x00 0x01)
P1=process identity
L1=length of process identity (i.e. 0x00 0x01)

Figures 14, 15, 16:
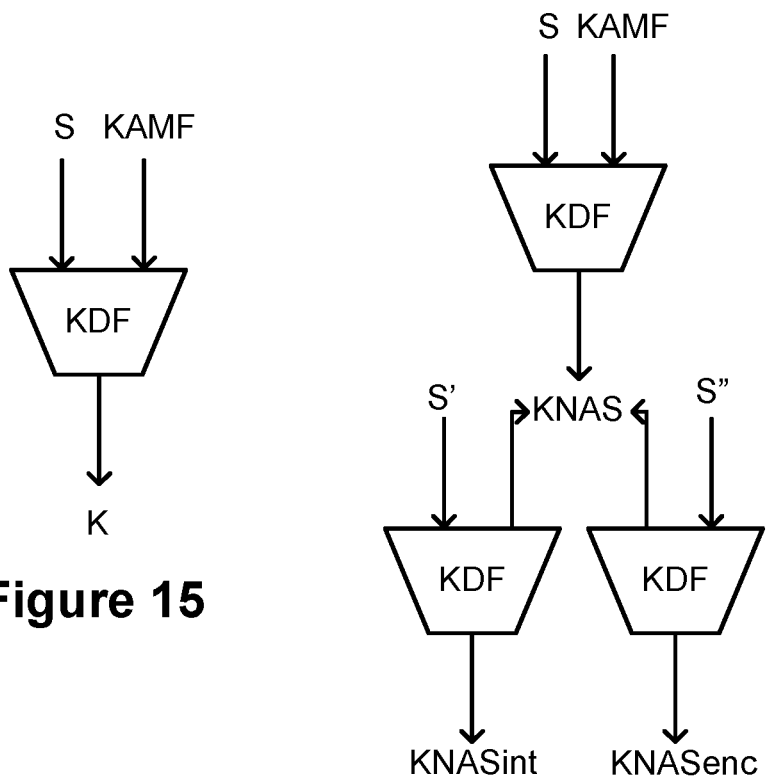
FIG. 14 illustrates process type distinguishers that may be used according to some embodiments of inventive concepts.
FIGS. 15 and 16 illustrate key derivations that may be used according to some embodiments of inventive concepts.

The process type distinguisher shall be NAS-enc-alg for NAS encryption processes and NAS-int-alg for NAS integrity protection processes. (see table A.7-1). FIG. 14 is a table illustrating process type distinguishers.

The process identity (as specified in clause 5 of TS 33.401, also referred to as reference [2]) may/shall be put in the four least significant bits of the octet. The two least significant bits of the four most significant bits may be reserved for future use, and the two most significant bits of the most significant nibble may be reserved for private use. The entire four most significant bits may/shall be set to all zeros.

For NAS process key derivations, the input key may/shall be the 256-bit KASME. For a process key of length n bits, where n is less or equal to 256, the n least significant bits of the 256 bits of the KDF output may/shall be used as the process key (also referred to as an algorithm key).

As discussed above with respect to FIGS. 10A-B, 11A-B, 12A-B, and 13A-B, the NAS Connection Identifier NAS CONN ID may be used in the authentication and/or ciphering/deciphering processes to provide separation for different NAS connections used by a same wireless terminal.

According to some embodiments, the NAS CONN ID may be used in the derivation of the NAS protection keys KNASenc and KNASint. The resulting protection keys may thus be NAS connection-specific to provide separation for different NAS connections used by the same wireless terminal.

For example, a new parameter P2 may be introduced for the construction of the input S string. This parameter P2 would be the NAS CONN ID and its length L2 would be whatever length the NAS CONN ID has (in octets). For example, if the NAS CONN ID is 8 bits long then L2 is 1 (for one octet). If the NAS CONN ID is specified to be a 32-bits long value, then L2 would be set to the constant 4 (for four octets). All the other parameters (P0, P1) may remain the same or may be based on the 5G-equivalents.

FIG. 15 illustrates Key derivation based on the S string where the NAS CONN ID is used in the derivation of the S string. Here, the master key KAMF and S are provided as inputs to the key derivation function KDF to generate the KEY K that is used for EIA authentication and/or EEA ciphering/deciphering. In FIG. 15:

KAMF is the KASME-equivalent in 5G;
S is constructed as the concatenation FC||P0||L0||P1||L1||P2||L2 where:
FC is potentially a new distinguisher for the derivation of the NAS protection key,
P0, P1, L0 and L1 are based on potentially new parameters and values equivalent to the ones used in the LTE. In fact, the algorithms in 5G could potentially have other names and other type distinguisher values, etc.,
P2 and L2 are the new parameters based on the NAS CONN ID.

Depending on the FC value, the same procedure is used to derive a NAS integrity protection key or a NAS ciphering key. Since the NAS CONN ID is used in the derivation function, those keys would be then NAS connection specific.

According to some other embodiments, the NAS CONN ID may be used to derive a new level key KNAS from the KAMF key which is then used to derive the other lower level protection keys. The KNAS and the derived protection keys may thus be NAS connection-specific.

For example, a new key called KNAS may be derived from the KAMF as shown in FIG. 16 where S is set to FC||P0||L0 with FC having a new value and P0, L0 corresponding to the NAS CONN ID. In fact, P0 and L0 are defined similarly to P2 and L2 as discussed above with respect to FIG. 15. Because the NAS CONN ID is used in the derivation of this new intermediary key, it is thus NAS connection specific. Everything that is subsequently derived from the KNAS key would be also NAS connection specific. Therefore, it is proposed to derive the NAS protection key KNASint and KNASenc from the KNAS similarly to how it is done in legacy systems when they are derived from the KASME.

The overall key derivation scheme producing the NAS protection keys may thus be provided as illustrated in FIG. 16. In embodiments of providing key derivation based on the NAS CONN ID, a larger number of connection specific parameters may be used/needed compared to embodiments discussed above with respect to FIGS. 10A-B, 11A-B, 12A-B, and 13A-B.

Example embodiments are discussed below.

1. A method at a first communication node providing communication of Network Access Stratum (NAS) messages with a second communication node, the method comprising: providing (1711) a first NAS connection identification for a first NAS connection between the first and second communication nodes; providing (1713) a second NAS connection identification for a second NAS connection between the first and second communication nodes, wherein the first and second NAS connection identifications are different, and wherein the first and second NAS connections are different; communicating (1717) a first NAS message between the first and second communication nodes over the first NAS connection, wherein communicating the first NAS message comprises at least one of performing integrity protection for the first NAS message using the first NAS connection identification and/or performing confidentiality protection for the first NAS message using the first NAS connection identification; and communicating (1719) a second NAS message between the first and second communication nodes over the second NAS connection, wherein communicating the second NAS message comprises at least one of performing integrity protection for the second NAS message using the second NAS connection identification and/or performing confidentiality protection for the second NAS message for confidentiality protection using the second NAS connection identification.

2. The method of Embodiment 1, wherein the first and second NAS connections share a master key of a NAS security context, wherein communicating the first NAS message comprises at least one of performing integrity protection for the first NAS message using the first NAS connection identification and the master key and/or performing confidentiality protection for the first NAS message using the first NAS connection identification and the master key, and wherein communicating the second NAS message comprises at least one of performing integrity protection for the second NAS message using the second NAS connection identification and the master key and/or performing confidentiality protection for the second NAS message using the second NAS connection identification and the master key.

3. The method of Embodiment 1, wherein the first and second NAS connections share a master key of a NAS security context, wherein communicating the first NAS message comprises performing the integrity protection for the first NAS message by generating a first message authentication code based on the first NAS connection identification, the master key, and the first NAS message, and transmitting the first NAS message with the first message authentication code over the first NAS connection to the second communication node, and wherein communicating the second NAS message comprises performing the integrity protection for the second NA message by generating a second message authentication code based on the second NAS connection identification, the master key, and the second NAS message, and transmitting the second NAS message with the second message authentication code over the second NAS connection to the second communication node.

4. The method of Embodiment 3, wherein the first NAS connection identification is concatenated with a first NAS count for the first NAS message, wherein the concatenation of the first NAS connection identification and the first NAS count is provided as an input to generate the first message authentication code, wherein the second NAS connection identification is concatenated with a second NAS count for the second NAS message, and wherein the concatenation of the second NAS connection identification and the second NAS count is provided as an input to generate the second message authentication code.

5. The method of Embodiment 3, wherein the first NAS connection identification is provided as an input to generate the first message authentication code, and wherein the second NAS connection identification is provided as an input to generate the second message authentication code.

6. The method of Embodiment 3, wherein the master key and the first NAS connection identification are used to derive a first integrity protection key used to generate the first message authentication code, and wherein the master key and the second NAS connection identification are used to derive a second integrity protection key used to generate the second message authentication code.

7. The method of any of Embodiments 3-6 wherein performing integrity protection for the first NAS message comprises performing integrity protection for the first NAS message using a 5G compatible EIA integrity protection interface, and wherein performing integrity protection for the second NAS message comprises performing integrity protection for the second NAS message using the 5G compatible EIA integrity protection interface.

8. The method of Embodiment 1, wherein the first and second NAS connections share a master key of a NAS security context, wherein communicating the first NAS message comprises performing confidentiality protection for the first NAS message by ciphering the first NAS message using the first NAS connection identification and the master key to provide a first ciphered NAS message, and transmitting the first ciphered NAS message over the first NAS connection to the second communication node, and wherein communicating the second NAS message comprises performing confidentiality protection for the second NAS message by ciphering the second NAS message using the second NAS connection identification and the master key to provide a second ciphered NAS message, and transmitting the second ciphered NAS message over the second NAS connection to the second communication node.

9. The method of Embodiment 8, wherein the first NAS connection identification is concatenated with a first NAS count for the first NAS message, wherein the concatenation of the first NAS connection identification and the first NAS count is provided as an input to generate the first ciphered NAS message, wherein the second NAS connection identification is concatenated with a second NAS count for the second NAS message, and wherein the concatenation of the second NAS connection identification and the second NAS count is provided as an input to generate the second ciphered NAS message.

10. The method of Embodiment 8, wherein the first NAS connection identification is provided as an input to generate the first ciphered NAS message, wherein the second NAS connection identification is provided as an input to generate the second ciphered NAS message.

11. The method of Embodiment 8, wherein the master key and the first NAS connection identification are used to derive a first ciphering key that is used to generate the first ciphered NAS message, and wherein the master key and the second NAS connection identification are used to derive a second ciphering key that is used to generate the second ciphered NAS message.

12. The method of any of Embodiments 8-11 wherein performing confidentiality protection for the first NAS message comprises performing confidentiality protection for the first NAS message using a 5G compatible EEA ciphering interface, and wherein performing confidentiality protection for the second NAS message comprises performing confidentiality protection for the second NAS message using the 5G compatible EEA ciphering interface.

13. The method of Embodiment 1, wherein the first and second NAS connections share a master key of a NAS security context, wherein communicating the first NAS message comprises, receiving the first NAS message with a first message authentication code over the first NAS connection from the second communication node, performing the integrity protection for the first NAS message by generating a first derived message authentication code for the first NAS message based on the first NAS connection identification, the master key, and the first NAS message, and processing the first NAS message responsive to the first message authentication code and the first derived message authentication code matching, and wherein communicating the second NAS message comprises, receiving the second NAS message with a second message authentication code over the second NAS connection from the second communication node, performing the integrity protection for the second NAS message by generating a second derived message authentication code for the second NAS message based on the second NAS connection identification, the master key, and the second NAS message, and processing the second NAS message responsive to the second message authentication code and the second derived message authentication code matching.

14. The method of Embodiment 13, wherein the first NAS connection identification is concatenated with a first NAS count for the first NAS message, wherein the concatenation of the first NAS connection identification and the first NAS count is provided as an input to generate the first derived message authentication code, wherein the second NAS connection identification is concatenated with a second NAS count for the second NAS message, and wherein the concatenation of the second NAS connection identification and the second NAS count is provided as an input to generate the second derived message authentication code.

15. The method of Embodiment 13, wherein the first NAS connection identification is provided as an input to generate the first derived message authentication code, wherein the second NAS connection identification is provided as an input to generate the second derived message authentication code.

16. The method of Embodiment 13, wherein the master key and the first NAS connection identification are used to derive a first integrity protection key used to generate the first derived message authentication code, and wherein the master key and the second NAS connection identification are used to derive a second integrity protection key used to generate the second derived message authentication code.

17. The method of any of Embodiments 13-16 wherein performing integrity protection for the first NAS message comprises performing integrity protection for the first NAS message using a 5G compatible EIA integrity protection interface, and wherein performing integrity protection for the second NAS message comprises performing integrity protection for the second NAS message using the 5G compatible EIA integrity protection interface.

18. The method of Embodiment 1, wherein the first and second NAS connections share a master key of a NAS security context, wherein communicating the first NAS message comprises, receiving a first ciphered NAS message over the first NAS connection from the second communication node, performing confidentiality protection for the first NAS message by deciphering the first ciphered NAS message using the first NAS connection identification and the master key to provide a first deciphered NAS message, and processing the first deciphered NAS message, wherein communicating the second NAS message comprises, receiving a second ciphered NAS message over the second NAS connection from the second communication node, performing confidentiality protection for the second NAS message by deciphering the second ciphered NAS message using the second NAS connection identification and the master key to provide a second deciphered NAS message, and processing the second deciphered NAS message.

19. The method of Embodiment 18, wherein the first NAS connection identification is concatenated with a first NAS count for the first NAS message, wherein the concatenation of the first NAS connection identification and the first NAS count is provided as an input to generate the first deciphered NAS message, wherein the second NAS connection identification is concatenated with a second NAS count for the second NAS message, and wherein the concatenation of the second NAS connection identification and the second NAS count is provided as an input to generate the second ciphered NAS message.

20. The method of Embodiment 18, wherein the first NAS connection identification is provided as an input to generate the first deciphered NAS message, wherein the second NAS connection identification is provided as an input to generate the second deciphered NAS message.

21. The method of Embodiment 18, wherein the master key and the first NAS connection identification are used to derive a first deciphering key used to generate the first deciphered NAS message, and wherein the master key and the second NAS connection identification are used to derive a second deciphering key used to generate the second deciphered NAS message.

22. The method of any of Embodiments 18-21 wherein performing confidentiality protection for the first NAS message comprises performing confidentiality protection for the first NAS message using a 5G compatible EEA deciphering interface, and wherein performing confidentiality protection for the second NAS message comprises performing confidentiality protection for the second NAS message using the 5G compatible EEA deciphering interface.

23. The method of any of Embodiments 1-22, wherein the first NAS connection is provided through a 3GPP access node between the first and second communication nodes and the second NAS connection is provided through a non-3GPP access node between the first and second communication nodes, or wherein the first NAS connection is provided through a non-3GPP access node between the first and second communication nodes and the second NAS connection is provided through a 3GPP access node between the first and second communication nodes.

24. The method of Embodiment 23, wherein the 3GPP access node comprises a radio access network base station, and wherein the non-3GPP access node comprises at least one of a WiFi access node and/or a satellite access node.

25. The method of any of Embodiments 1-24, wherein the first and second NAS connections are maintained concurrently between the first and second communication nodes.

26. The method of any of Embodiments 1-25, wherein the first communication node comprises a network node of a wireless communication network and the second communication node comprises a wireless terminal, or wherein the first communication node comprises a wireless terminal and the second communication node comprises a network node of a wireless communication network.

27. The method of any of Embodiments 1-26, the method further comprising: establishing a Packet Data Unit (PDU) session based on the first and second NAS messages to communicate user plane data between the first and second communication nodes.

28. A method at a first communication node providing communication of Network Access Stratum (NAS) messages with a second communication node, the method comprising: providing (1801) a first NAS connection between the first and second communication nodes; providing (1803) a second NAS connection between the first and second communication nodes, wherein the first and second NAS connections are different; allocating (1805) a NAS count domain so that a first portion of the NAS count domain is allocated for NAS messages communicated over the first NAS connection and so that a second portion of the NAS count domain is allocated for NAS messages communicated over the second NAS connection, wherein the first and second portions of the NAS count domain are mutually exclusive; communicating (1811, 1831) NAS messages over the first NAS connection using a lowest NAS count value from the first portion of the NAS count domain that has not been previously used for each NAS message communicated over the first NAS connection; and communicating (1813, 1833) NAS messages over the second NAS connection using a lowest NAS count value from the second portion of the NAS count domain that has not been previously used for each NAS message communicated over the second NAS connection.

29. The method of Embodiment 28, wherein NAS count values of the first and second portions of the NAS count domain are interleaved.

30. The method of Embodiment 29, wherein the first portion of the NAS count domain includes even NAS count values, and wherein the second portion of the NAS count domain includes odd NAS count values.

31. The method of any of Embodiments 28-29, the method further comprising: providing (1816) a third NAS connection between the first and second communication nodes, wherein the first and third NAS connections are different and the second and third NAS connections re different, wherein a third portions of the NAS count domain is allocated for NAS messages communicated over the third NAS connection, wherein the first, second, and third portions of the NAS count domain are mutually exclusive; and communicating (1835) NAS messages over the third NAS connection using a lowest NAS count value from the third portion of the NAS count domain that has not been previously used for the third NAS connection.

32. The method of Embodiment 31, wherein the first portion of the NAS count domain includes NAS count values divisible by 3, wherein the second portion of the NAS count domain comprises NAS count values for which division by 3 provides a reminder of 1, and wherein the third portion of the NAS count domain comprises NAS count values for which division by 3 provides a reminder of 2.

33. The method of any of Embodiments 28-32, wherein the first communication node comprises a network node and the second communication node comprises a wireless terminal, wherein the NAS count domain is an uplink NAS count domain, wherein communicating NAS messages over the first NAS connection comprises receiving NAS messages over the first NAS connection, and wherein communicating NAS messages over the second NAS connection comprises receiving NAS messages over the second NAS connection.

34. The method of any of Embodiments 28-32, wherein the first communication node comprises a network node and the second communication node comprises a wireless terminal, wherein the NAS count domain is a downlink NAS count domain, wherein communicating NAS messages over the first NAS connection comprises transmitting NAS messages over the first NAS connection, and wherein communicating NAS messages over the second NAS connection comprises transmitting NAS messages over the second NAS connection.

35. The method of any of Embodiments 28-32, wherein the first communication node comprises a wireless terminal and the second communication node comprises a network node, wherein the NAS count domain is an uplink NAS count domain, wherein communicating NAS messages over the first NAS connection comprises transmitting NAS messages over the first NAS connection, and wherein communicating NAS messages over the second NAS connection comprises transmitting NAS messages over the second NAS connection.

36. The method of any of Embodiments 28-32, wherein the first communication node comprises a wireless terminal and the second communication node comprises a network node, wherein the NAS count domain is a downlink NAS count domain, wherein communicating NAS messages over the first NAS connection comprises receiving NAS messages over the first NAS connection, and wherein communicating NAS messages over the second NAS connection comprises receiving NAS messages over the second NAS connection.

37. The method of any of Embodiments 28-36, wherein the first NAS connection is provided through a 3GPP access node between the first and second communication nodes and the second NAS connection is provided through a non-3GPP access node between the first and second communication nodes, or wherein the first NAS connection is provided through a non-3GPP access node between the first and second communication nodes and the second NAS connection is provided through a 3GPP access node between the first and second communication nodes.

38. The method of Embodiment 37, wherein the 3GPP access node comprises a radio access network base station, and wherein the non-3GPP access node comprises at least one of a WiFi access node and/or a satellite access node.

39. The method of any of Embodiments 28-38, wherein communicating NAS messages over the first NAS connection comprises at least one of performing integrity protection by generating message authentication codes using respective NAS count values from the first portion of the NAS count domain and/or performing confidentiality protection using respective NAS count values from the first portion of the NAS count domain, and wherein communicating NAS messages over the second NAS connection comprises at least one of performing integrity protection by generating message authentication codes using respective NAS count values from the second portion of the NAS count domain and/or performing confidentiality protection using respective NAS count values from the second portion of the NAS count domain.

40. A communication node, wherein the communication node is adapted to perform operations according to any of Embodiments 1-39.

41. A communication node, wherein the communication node includes modules configured to perform operations according to any of Embodiments 1-39.

42. A first communication node comprising: a communication interface (601, 701) configured to provide communication with a second communication node; and a processor (603,703) coupled with the communication interface, wherein the processor is configured to transmit communications to the second communication node and/or receive communications from the second communication node through the communication interface, wherein the processor is configured to perform operations according to any of Embodiments 1-39.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following claims and their equivalents, and shall not be restricted or limited by the foregoing detailed description.

Abbreviations mentioned above are discussed below.

| Abbreviation | Explanation |
| --- | --- |
| AMF | Access Management Function |
| CM | Connection Management |
| CONN ID | Connection Identification |
| EEA | EPS Encryption Algorithm |
| EIA | EPS Integrity Algorithm |
| eKSI | Key Set Identifier in E-UTRAN |
| EMM | EPS Mobility Management |
| EPC | Evolved Packet Core |
| EPS | Evolved Packet System |
| IE | Information Element |
| KAMF | AMS-specific Key |
| KASME | Key Access Security Management Entry |
| KDF | Key Derivation Function |
| KNAS | NAS protection Key |
| KNASenc | KNAS encryption |
| KNASint | KNAS integrity |
| LTE | Long Term Evolution |
| MAC | Message Authentication Code |
| NAS | Network Access Stratum |
| PDU | Packet Data Unit |
| SMC | Security Mode Command |
| SN | Sequence number |
| UE | User Equipment |
| 3GPP | 3rd Generation Partnership Project |
| 5G | 5th Generation |

References mentioned above are identified below.

Ref [1] 3GPP TS 23.501 V0.4.0 (2017 April), Technical Specification Group Services and System Aspects; System Architecture for the 5G System; Stage 2 (Release 15)

Ref [2] 3GPP TS 33.401 V14.2.0 (2017 March), Technical Specification Group Services and System Aspects; 3GPP System Architecture Evolution (SAE); Security architecture (Release 14)

Ref. [3] 3GPP TS 24.301 V14.3.0 (2017 March), Technical Specification Group Core Network and Terminals; Non-Access-Stratum (NAS) protocol for Evolved Packet System (EPS); Stage 3 (Release 14)

Ref. [4] 3GPP TS 33.220 V14.0.0 (2016 December), Technical Specification Group Services and System Aspects; Generic Authentication Architecture (GAA); Generic Bootstrapping Architecture (GBA) (Release 14)

Ref [5] Krawczyk, et al., "HMAC: Keyed-Hashing for Message Authentication," RFC 2114, February 1997

The invention claimed is:

1. A method at a first communication node providing communication of Network Access Stratum, NAS, messages with a second communication node of a wireless communication network, the method comprising:
communicating a first NAS message between the first communication node and the second communication node over a first NAS connection, wherein communicating the first NAS message comprises:
performing integrity protection for the first NAS message using a first NAS connection identification by generating a first message authentication code based on the first NAS connection identification, a master key of a NAS security context, and the first NAS message, wherein the first NAS connection identification is provided as an input to generate the first message authentication code, and
transmitting the first NAS message with the first message authentication code over the first NAS connection to the second communication node, wherein the first communication node is either a wireless terminal or a network node of a radio access network (RAN); and
communicating a second NAS message between the first communication node and the second communication node over a second NAS connection, wherein communicating the second NAS message comprises;
performing integrity protection for the second NAS message using a second NAS connection identification, wherein the first and second NAS connections are different and share the master key by generating a second message authentication code based on the second NAS connection identification, the master key, and the second NAS message, wherein the second NAS connection identification is provided as an input to generate the second message authentication code, and
transmitting the second NAS message with the second message authentication code over the second NAS connection to the second communication node, wherein the first and second NAS connections are parallel NAS connections that are associated with a same wireless terminal and are secured using the master key.

2. The method of claim 1, wherein performing integrity protection for the first NAS message comprises performing integrity protection for the first NAS message using a 5G compatible EIA integrity protection interface, and wherein performing integrity protection for the second NAS message comprises performing integrity protection for the second NAS message using the 5G compatible EIA integrity protection interface.

3. The method of claim 1, wherein the first NAS connection is provided through a 3GPP access node between the first communication node and the second communication node and second NAS connection is provided through a non-3GPP access node between the first communication node and the second communication node, or wherein the first NAS connection is provided through a non-3GPP access node between the first communication node and the second communication node and the second NAS connection is provided through a 3GPP access node between the first communication node and the second communication node.

4. The method of claim 3, wherein the 3GPP access node comprises a radio access network base station, and wherein the non-3GPP access node comprises at least one of a WiFi access node and/or a satellite access node.

5. The method of claim 1, wherein the first and second NAS connections are maintained concurrently between the first communication node and the second communication node.

6. The method of claim 1, the method further comprising:
establishing a Packet Data Unit, PDU, session based on the first and second NAS messages to communicate user plane data between the first communication node and the second communication node.

7. A first communication node adapted to provide communication of Network Access Stratum, NAS, messages with a second communication node of a wireless communication network, wherein the first communication node comprises:
a processor; and
a memory storing instructions that, when executed by the processor, cause the first communication node to perform operations comprising:
communicating a first NAS message between the first communication node and the second communication node over the first NAS connection, wherein communicating the first NAS message comprises:
performing integrity protection for the first NAS message using the first NAS connection identification by generating a first message authentication code based on the first NAS connection identification, the master key, and the first NAS message, wherein the first NAS connection identification is provided as an input to generate the first message authentication code, and
transmitting the first NAS message with the first message authentication code over the first NAS connection to the second communication node, wherein the first communication node is either a wireless terminal or a network node of a radio access network (RAN); and
communicating a second NAS message between the first communication node and the second communication node over the second NAS connection, wherein communicating the second NAS message comprises:
performing integrity protection for the second NAS message using a second NAS connection identification by generating a second message authentication code based on the second NAS connection identification, the master key, and the second NAS message, wherein the second NAS connection identification is provided as an input to generate the second message authentication code, and
transmitting the second NAS message with the second message authentication code over the second NAS connection to the second communication node, wherein the first and second NAS connections are parallel NAS connections that are associated with a same wireless terminal and are secured using the master key.

8. The first communication node of claim 7, wherein performing integrity protection for the first NAS message comprises performing integrity protection for the first NAS message using a 5G compatible EIA integrity protection interface, and wherein performing integrity protection for the second NAS message comprises performing integrity protection for the second NAS message using the 5G compatible EIA integrity protection interface.

9. The first communication node of claim 7, wherein the first NAS connection is provided through a 3GPP access node between the first communication node and the second communication node and the second NAS connection is provided through a non-3GPP access node between the first communication node and the second communication node, or wherein the first NAS connection is provided through a non-3GPP access node between the first communication node and the second communication node and the second NAS connection is provided through a 3GPP access node between the first communication node and the second communication node.

10. The first communication node of claim 9, wherein the 3GPP access node comprises a radio access network base station, and wherein the non-3GPP access node comprises at least one of a WiFi access node and/or a satellite access node.

11. The first communication node of claim 7, wherein the first and second NAS connections are maintained concurrently between the first communication node and the second communication node.

12. The first communication node of claim 7, wherein the first communication node is further adapted to establish a Packet Data Unit, PDU, session based on the first and second NAS messages to communicate user plane data between the first communication node and the second communication node.

13. A first communication node comprising:
- a communication interface configured to provide communication with a second communication node;
- a processor coupled with the communication interface, wherein the processor is configured to transmit communications to the second communication node and/or receive communications from the second communication node through the communication interface; and
- a memory storing instructions that, when executed by the processor, configure the processor to:
- communicate a first NAS message between the first communication node and the second communication node over a first NAS connection, wherein communicating the first NAS message comprises;
  - performing integrity protection for the first NAS message using a first NAS connection identification by generating a first message authentication code based on the first NAS connection identification, a master key of a NAS security context, and the first NAS message, wherein the first NAS connection identification is provided as an input to generate the first message authentication code, and
  - transmitting the first NAS message with the first message authentication code over the first NAS connection to the second communication node, wherein the first communication node is either a wireless terminal or a network node of a radio access network (RAN); and
- communicate a second NAS message between the first communication node and the second communication node over a second NAS connection, wherein communicating the second NAS message comprises;
  - performing integrity protection for the second NAS message using a second NAS connection identification by generating a second message authentication code based on the second NAS connection identification, the master key, and the second NAS message, wherein the first and second NAS connections are different and share the master key, the second NAS connection identification is provided as an input to generate the second message authentication code, and
  - transmitting the second NAS message with the second message authentication code over the second NAS connection to the second communication node, wherein the first and second NAS connections are parallel NAS connections that are associated with a same wireless terminal and are secured using the master key.

* * * * *